United States Patent
Nakashima

[11] Patent Number: 5,544,053
[45] Date of Patent: Aug. 6, 1996

[54] SYSTEM AND METHOD FOR THE CONTROL OF SHIFTING OF VEHICLE AUTOMATIC TRANSMISSION

[75] Inventor: Yasuhiro Nakashima, Kyoto, Japan

[73] Assignee: Mitsubishi Jidosha Kogyo Kabushiki Kaisha, Tokyo, Japan

[21] Appl. No.: 258,336

[22] Filed: Jun. 10, 1994

[30] Foreign Application Priority Data

Jun. 11, 1993 [JP] Japan ................... 5-140465

[51] Int. Cl.$^6$ ............ B60K 41/06; F16K 61/00
[52] U.S. Cl. ............ 364/424.1; 477/78; 477/135; 180/170
[58] Field of Search ............ 364/424.1, 426.01; 395/900, 905; 74/866, 867; 192/4 R, 0.032, 0.052, 0.092; 180/170; 477/14, 34, 50, 64, 68, 78, 80, 95, 150, 135, 905, 114, 117, 120

[56] References Cited

U.S. PATENT DOCUMENTS

| | | | |
|---|---|---|---|
| 4,539,870 | 9/1985 | Sugano | 477/117 |
| 4,648,289 | 3/1987 | Kubo et al. | 477/93 |
| 4,686,872 | 8/1987 | Aoki et al. | 477/114 |
| 5,036,730 | 8/1991 | Sakai et al. | 74/866 |
| 5,038,637 | 8/1991 | Sugano | 477/150 |
| 5,079,704 | 1/1992 | Sakai et al. | 364/424.1 |
| 5,109,733 | 5/1992 | Ishikawa et al. | 475/120 |
| 5,231,898 | 8/1993 | Okura | 477/95 |
| 5,235,875 | 8/1993 | Yoshida et al. | 74/866 |
| 5,289,740 | 3/1994 | Milunas et al. | 364/424.1 |
| 5,323,318 | 6/1994 | Hasegawa et al. | 74/867 |
| 5,389,050 | 2/1995 | Sakai et al. | 364/424.1 |

FOREIGN PATENT DOCUMENTS

| | | |
|---|---|---|
| 63-246546 | 10/1988 | Japan . |
| 23738 | 1/1990 | Japan . |
| 2212655 | 8/1990 | Japan . |
| 4337157 | 11/1992 | Japan . |

*Primary Examiner*—Kevin J. Teska
*Assistant Examiner*—Tan Nguyen

[57] ABSTRACT

This invention relates to a shift control system and method for a vehicle automatic transmission, in which control of a downshift on a downhill road is performed by fuzzy inference. When a vehicle has been determined to be running on a downhill road by a driving state determining device, a speed range setting device sets as an optimal speed range a speed range lower than a current speed range. In the automatic transmission, the state of engagement of a desired engaging element is changed over to achieve the optimal speed range. When the vehicle has been determined to be running on the downhill road by the driving state determining device so that the speed range lower than the current speed range has been set as the optimal speed range and also when no change has been determined in engine load by an engine load detecting device, an engagement state control device reduces engaging force to be produced upon changing over the state of engagement of a desired engaging element for achieving the optimal speed range. This makes it possible to eliminate a sense of incogruity, which would otherwise occur upon shifting to a higher speed range, while assuring a good shifting response.

8 Claims, 20 Drawing Sheets

SYSTEM AND METHOD FOR THE CONTROL OF SHIFTING OF VEHICLE AUTOMATIC TRANSMISSION

BACKGROUND OF THE INVENTION a) Field of the Invention

This invention relates to a system and method for the control of shifting of a vehicle automatic transmission, in which upon setting, for example, a normal speed range corresponding to a vehicle speed and an engine load, the control of the shifting is performed incorporating setting of the speed range by fuzzy inference on the basis of information on running state of a vehicle, information on driving behavior intended by a driver for the vehicle, information on conditions of a road on which the vehicle is running, and the like. In particular, this invention is concerned with a system and method for the control of shifting of a vehicle automatic transmission, which are designed to perform most suitable control of a downshift on a downhill road.

b) Description of the Related Art

A conventional vehicle automatic transmission suitable for use on an automotive vehicle is designed to perform a change-over in speed range such as an upshift or a downshift on the basis of a preset shift pattern upon receipt of information on an engine load such a throttle opening, information on a vehicle speed and information on a current speed range.

Such a conventional vehicle automatic transmission involves no particular serious problem in shifting the speed range on a flat road as in street running, whereby the shifting is smooth and gives no sense of incongruity. When running, for example, in a mountainous region, however, there are straight uphill roads and also frequently bent uphill roads as well as downhill slopes requiring a strong engine brake and gentle long downhill slopes. There are also drivers who abruptly accelerate their vehicles on a downhill slope and apply a strong brake immediately entering a corner.

While running in such a mountainous region, it is rather difficult to choose a speed range optimal to the state of running of the vehicle, the driving behavior intended by the driver, road conditions and the like. There is accordingly a demand for permitting good control of motion of a vehicle by a simple running operation even during running in a mountainous region so that better drive feeling and run feeling can be obtained.

For such a demand, it is known, for example, from Japanese Patent Application Laid-Open (Kokai) No. SHO 62-246546 or HEI 2-3738 to perform the so-called "fuzzy control" so that an optimal speed range corresponding to the above-described state of running of the vehicle can be selected.

These conventional shift control methods are designed to set optimal speed ranges by inferring all gear positions for running in both urban and mountainous regions in accordance with fuzzy inference. These conventional shift control methods making use of "fuzzy control" are however accompanied by the problem that they require many rules and hence a membership function of an intricate profile. This has led to the problems that a large-capacity computer is needed to put such a method into practical application and tuning of the control is difficult, thereby making it difficult to apply the control method to other types of automotive vehicles.

Further, additional incorporation of shift control by "fuzzy control" may result in the execution of shifting by such a small change in the running or driving state, e.g., running-over of a small bump or slight depression of an accelerator pedal that no shifting would take place according to the conventional art. This has led to the problem that the above shifting may give a sense of incongruity to drivers who are accustomed to running on flat roads such as street running under control by a conventional automatic transmission.

With a view to overcoming these problems, a shift control method was proposed in Japanese Patent Application Laid-Open (Kokai) No. HEI 2-212655. According to this shift control method, various parameters indicating the state of running of a vehicle are detected so that detection signals are produced. Based on the detection signals and a membership function set beforehand, fuzzy inference is conducted to determine the degree of running resistance. When this running resistance is greater than a predetermined value, a shift map for high-load running is selected in place of a shift map for normal running so that a speed range is determined by the shift map for high-load running.

According to this proposal, the same shift map is used for both straight uphill roads and frequently bent uphill roads, leading to the problem that carefully thought-out shift control can be hardly conducted to sufficient extents in the light of the above-mentioned various road conditions in mountainous regions and also intended driving behaviors. If the shift map for normal running is changed over to the shift map for high-load running based solely upon the occurrence of running resistance greater than the predetermined value and a speed range is then set in accordance with the latter map, the speed range so selected in accordance with the shift map for high-load running may become higher than the speed range which has been selected by the shift map for normal running. There is hence the potential problem that a sense of incongruity may be given to the driver.

A still further shift control method was hence proposed as disclosed in Japanese Patent Application Laid-Open (Kokai) No. HEI 4-337157. According to this shift control method, an optimal speed range is selected based on a normal shift pattern set beforehand and in addition, an optimal speed range is also selected by fuzzy inference on the basis of at least one of information on the state of operation of a vehicle, information on driving behavior intended by a driver and information on road conditions. The optimal speed range selected based on the normal shift pattern is usually set as a speed range for an automatic transmission but only when the optimal speed range selected by the fuzzy inference is lower than the optimal speed range selected based on the normal shift pattern, the optimal speed range selected by the fuzzy inference is set as a speed range for the automatic transmission.

Among such shift control methods making use of "fuzzy control" as mentioned above, those designed to perform setting of a speed range by fuzzy inference instead of setting of a speed range according to shifting characteristics for normal running as needed—as disclosed, for example, in Japanese Patent Applications Laid-Open Nos. HEI 4-337157 and 2-212655—may select by fuzzy inference a speed range lower than a speed range—which would otherwise be selected according to shifting characteristics for normal running—for example, on a downhill road to obtain a necessary engine brake, and may then set it as a speed range for an automatic transmission.

In this case, the downshift operation for obtaining the engine brake may give a sense of incongruity to the driver.

According to shift control by shifting characteristics for normal running, a downshift or an upshift is performed, for example, based on vehicle speed information and engine load (throttle opening) information while using such a map as shown in FIG. 20. In this shift map, the solid line a is an upshift line from 3rd speed to 4th speed while the alternate long and short dash line b is a downshift line from 4th speed to 3rd speed.

If the driver operates a throttle valve (in other words, depresses an accelerator pedal) to point B when the vehicle speed and the throttle opening are as indicated by point A, a downshift operation is performed after passing across the downshift line b, that is, at point C. This downshift operation is generally accompanied by a shift shock, which becomes larger especially where importance is placed on its response characteristic. The driver however can expect the shift shock in this case so that he does not feel a sense of incongruity upon shifting.

Further, the vehicle speed may increase from point A to point D in some instances even when the throttle opening is kept unchanged (in other words, even when the driver does not change the amount of depression of the accelerator pedal). If the vehicle is running on a flat road at this time, the vehicle speed increases passing across the upshift line a as illustrated in the diagram so that an upshift operation is performed. If the vehicle is running on a downhill road, however, a downshift from 3rd speed to 2nd speed may be commanded instead to obtain an engine brake as a result of selection of a speed range by fuzzy inference. As a consequence, a downshift operation is performed.

The driver cannot foresee the downshift in the above case, so that a shift shock produced as a result of the downshift operation gives a surprise to the driver. The driver feels a sense of substantial incongruity at the time of the shifting especially in a shifting operation which places importance on the response characteristic and produces a large shock. This leads to the problem that the smoothness of a shifting operation which is an inherent characteristic feature to an automatic transmission will be lost.

SUMMARY OF THE INVENTION

The present invention has been completed in view of the above-described problems. An object of this invention is therefore to provide a system and method for the control of shifting of a vehicle automatic transmission, which while permitting a downshift by fuzzy inference to obtain an engine brake in the course of running on a downhill road, can assure smoothness of a shifting operation by reducing a shift shock at the time of the downshift.

To achieve the above object, the present invention provides the following system and method for the control of shifting of a vehicle automatic transmission:

(A)

A shift control system for a vehicle automatic transmission in which desired one of plural speed ranges is achieved by selectively changing over the state of engagement of plural engaging elements, comprising:

means for detecting a load on an engine which outputs drive power to the automatic transmission, thereby, determining the state of loading on the engine;

means for determining the state of driving of a vehicle by fuzzy inference;

means for setting an optimal speed range out of the plural speed ranges on the basis of the results of the determination by the driving state determining means; and means for selectively controlling the state of engagement of the plural engaging elements, wherein said speed range setting means is provided with means for setting as the optimal speed state a speed range lower than a current speed range when the vehicle has been determined to be running on a downhill road by said driving state determining means; and said engagement state control means is provided with means for reducing an engaging force to be produced upon changing over the state of engagement of a desired engaging element for achieving the optimal speed range when the vehicle has been determined to be running on the downhill road by said driving state determining means so that the speed range lower than the current speed range has been set as the optimal speed range and also when no change has been determined in the engine load by said engine load detecting means.

The system (A) may include the following optional features:

(A-1)

The system (A) may further comprise means for detecting a speed of the vehicle, wherein said speed range setting means comprises:

first speed range setting means for setting the optimal speed range on the basis of the engine load and vehicle speed detected by said engine load detecting means and said vehicle speed detecting means, respectively;

second speed range setting means for setting, as the optimal speed range, the speed range lower than the current speed range when the vehicle has been determined to be running on the downhill road by said driving state determining means; and speed range determining means for comparing the optimal speed range set by said first speed range setting means with the optimal speed range set by said second speed range setting means and choosing the optimal speed range set by said second speed range setting means only when the optimal speed range set by said second speed range setting means is lower than the optimal speed range set by said first speed range setting means.

(A-2)

In the system (A), said engine load is indicated by an opening of a throttle valve or the rate of a change in the opening of the throttle valve or the amount of depression of an accelerator pedal or the rate of a change in the amount of depression of the accelerator pedal; and said engine load detecting means determines no change in the engine load when the opening of the throttle valve or the rate of the change in the opening of the throttle valve or the amount of depression of the accelerator pedal or the rate of the change in the amount of depression of the accelerator pedal is not greater than a predetermined value.

(A-3)

In the system (A), said engaging elements are hydraulic engaging elements selectively actuated by hydraulic pressure; and said engagement state control means controls the state of engagement of each of said hydraulic engaging elements by controlling hydraulic pressure to be fed to said hydraulic engaging element.

(A-4)

In the system (A) including the features (A-3), said engagement state control means is equipped with a first hydraulic pressure feeding pattern for feeding, during a change-over of the speed range, a hydraulic pressure of a predetermined value to the corresponding hydraulic engaging element and a second hydraulic pressure feeding pattern for feeding, during the change-over of the speed range, a hydraulic pressure of a value lower than the predetermined value to the corresponding hydraulic engaging element; and when the vehicle has been determined to be running on the downhill road by said driving state determining means and also when no change has been determined in the engine load by said engine load detecting means, said engagement state control means controls the engagement force of the desired hydraulic engaging element for achieving the optimal speed range on the basis of the second hydraulic pressure feeding pattern.

(B)

A method for controlling a shift of a vehicle automatic transmission in which desired one of plural speed ranges is achieved by selectively changing over the state of engagement of plural engaging elements, comprising the following steps:

detecting a load on an engine which outputs drive power to the automatic transmission, thereby determining the state of loading on the engine;

determining the state of driving of a vehicle by fuzzy inference;

setting an optimal speed range out of the plural speed ranges on the basis of the results of the determination by the driving state determining means; and selectively controlling the state of engagement of the plural engaging elements, wherein said speed range setting step comprises setting as the optimal speed state a speed range lower than a current speed range when the vehicle has been determined to be running on a downhill road in said driving state determining step; and said engagement state control step comprises reducing an engaging force to be produced upon changing over the state of engagement of a desired engaging element for achieving the optimal speed range when the vehicle has been determined to be running on the downhill road in said driving state determining step so that the speed range lower than the current speed range has been set as the optimal speed range and also when no change has been determined in the engine load in said engine load detecting step.

The above method (B) may include the following optional features:

(B-1)

The above method (B) may further comprises a step of detecting a speed of the vehicle, wherein said speed range setting step comprises:

a first speed range setting step of setting the optimal speed range on the basis of the engine load and vehicle speed detected in said engine load detecting step and said vehicle speed detecting step, respectively;

a second speed range setting step of setting, as the optimal speed range, the speed range lower than the current speed range when the vehicle has been determined to be running on the downhill road in said driving state determining step; and a speed range determining step for comparing the optimal speed range set in said first speed range setting step with the optimal speed range set in said second speed range setting step and choosing the optimal speed range set in said second speed range setting step only when the optimal speed range set in said second speed range setting step is lower than the optimal speed range set in said first speed range setting step.

(B-2)

In the method (B), said engine load is indicated by an opening of a throttle valve or the rate of a change in the opening of the throttle valve or the amount of depression of an accelerator pedal or the rate of a change in the amount of depression of the accelerator pedal; and said engine load detecting step determines no change in the engine load when the opening of the throttle valve or the rate of the change in the opening of the throttle valve or the amount of depression of the accelerator pedal or the rate of the change in the amount of depression of the accelerator pedal is not greater than a predetermined value.

(B-3)

In the method (B), said engaging elements are hydraulic engaging elements selectively actuated by hydraulic pressure; and said engagement state control step controls the state of engagement of each of said hydraulic engaging elements by controlling hydraulic pressure to be fed to said hydraulic engaging element.

(B-4)

In the method (B) including the feature (B-3), the control in said engagement state control step uses a first hydraulic pressure feeding pattern for feeding, during a change-over of the speed range, hydraulic pressure of a predetermined value to the corresponding hydraulic engaging element and a second hydraulic pressure feeding pattern for feeding, during the change-over of the speed range, a hydraulic pressure of a value lower than the predetermined value; and when the vehicle has been determined to be running on the downhill road in said driving state determining step and also when no change has been determined in the engine load in said engine load detecting step, said engagement state control step controls the engagement force of the desired hydraulic engaging element for achieving the optimal speed range on the basis of the second hydraulic pressure feeding pattern.

Since the method (B) and its optional features (B-1 to B-4) are similar in operation and advantages to the system (A) and its optional features (A-1 to A-4), the operation and advantages of the system and its optional features will hereinafter be described and those of the method will be omitted herein.

System (A) and Method (B)

When the vehicle has been found to be running on a downhill road by the driving state determining means, the speed range setting means sets as an optimal speed range a speed range lower than a current speed range and in the automatic transmission, the state of engagement of a desired engaging element is changed over to achieve this optimal speed range. Further, when the vehicle has been found to be running on a downhill road by the driving state determining means and the speed range lower than the current speed range has been set as the optimal speed range as described above and further when no change has been found to exist in the engine load by the engine load detecting means, the engagement state control means reduces an engaging force to be produced upon changing over the state of engagement of the desired engaging element for achieving the optimal speed range If the driver wishes acceleration by depressing the accelerator pedal while the vehicle is running on a downhill road, the engine load increases so that control to reduce an engaging force upon changing over the state of engagement of engaging elements is not performed. As a result, the speed range is shifted to a low speed range by an ordinary high engaging force, whereby the shifting is achieved promptly.

Where the driver, for example, does not additionally depress the accelerator pedal while the vehicle is running on a downhill road, control is performed to reduce an engaging force to be produced upon changing over the state of engagements of engaging elements because the engine load remains unchanged. As a consequence, the speed range is changed over to a low speed range by a low engaging force. This downshift can therefore be achieved without developing a shift shock.

It is therefore possible to eliminate a sense of incongruity at the time of shifting while assuring a good shift response. Further, the smoothness of a shifting operation, which is an inherent advantageous feature to an automatic transmission, can be retained. It is therefore possible to improve the drive feeling and further, the riding comfort.

Optional features (A-1) and (B-1)

According to the speed state setting means, the first speed range setting means sets an optimal speed range on the basis of an engine load and a vehicle speed detected by the engine load detecting means and the vehicle speed detecting means, respectively, and when the vehicle is determined to be running on a downhill road by the driving state determining means, the second speed range setting means sets the speed range at an optimal speed range lower than the current speed range.

The optimal speed range set by the first speed range setting means and the optimal speed range set by the second speed range setting means are then compared by the speed range setting means, and only when the latter optimal speed range is lower than the former optimal speed range, the latter optimal speed range is selected.

This has made it possible to simplify the shift control, thereby realizing stable shift control.

Optional features (A-2) and (B-2)

When the opening of the throttle valve or the rate of the change in the opening of the throttle valve or the amount of depression of the accelerator pedal or the rate of the change in the amount of depression of the accelerator pedal is not greater than a predetermined value, the engine load is determined to have remained unchanged. This makes it possible to easily and surely estimate the absence of any change in the engine load, in other words, the absence of an acceleration intended by the driver, so that the elimination of a sense of incongruity at the time of shifting can be adequately attained while retaining a good shift response.

Optional features (A-3) and (B-3)

The use of the hydraulic engaging elements as the engaging elements has made it possible to easily perform the control of the state of engagement (for example, an engaging force).

Optional features (A-4) and (B-4)

When the vehicle has been determined to be running on a downhill road by the driving state determining means and the engine load has been determined to have remained unchanged by the engine load detecting means, the engagement state control means controls an engaging force for each desired hydraulic engaging element, which is to be actuated to achieve the above optimal speed range, on the basis of the second hydraulic pressure feeding pattern which feeds a hydraulic pressure lower than a hydraulic pressure by the first hydraulic pressure feeding pattern.

This has simplified the control of an engaging force upon change-over of the speed range, thereby realizing stable shift control.

DETAILED DESCRIPTION OF THE INVENTION AND PREFERRED EMBODIMENT

Figure 2:
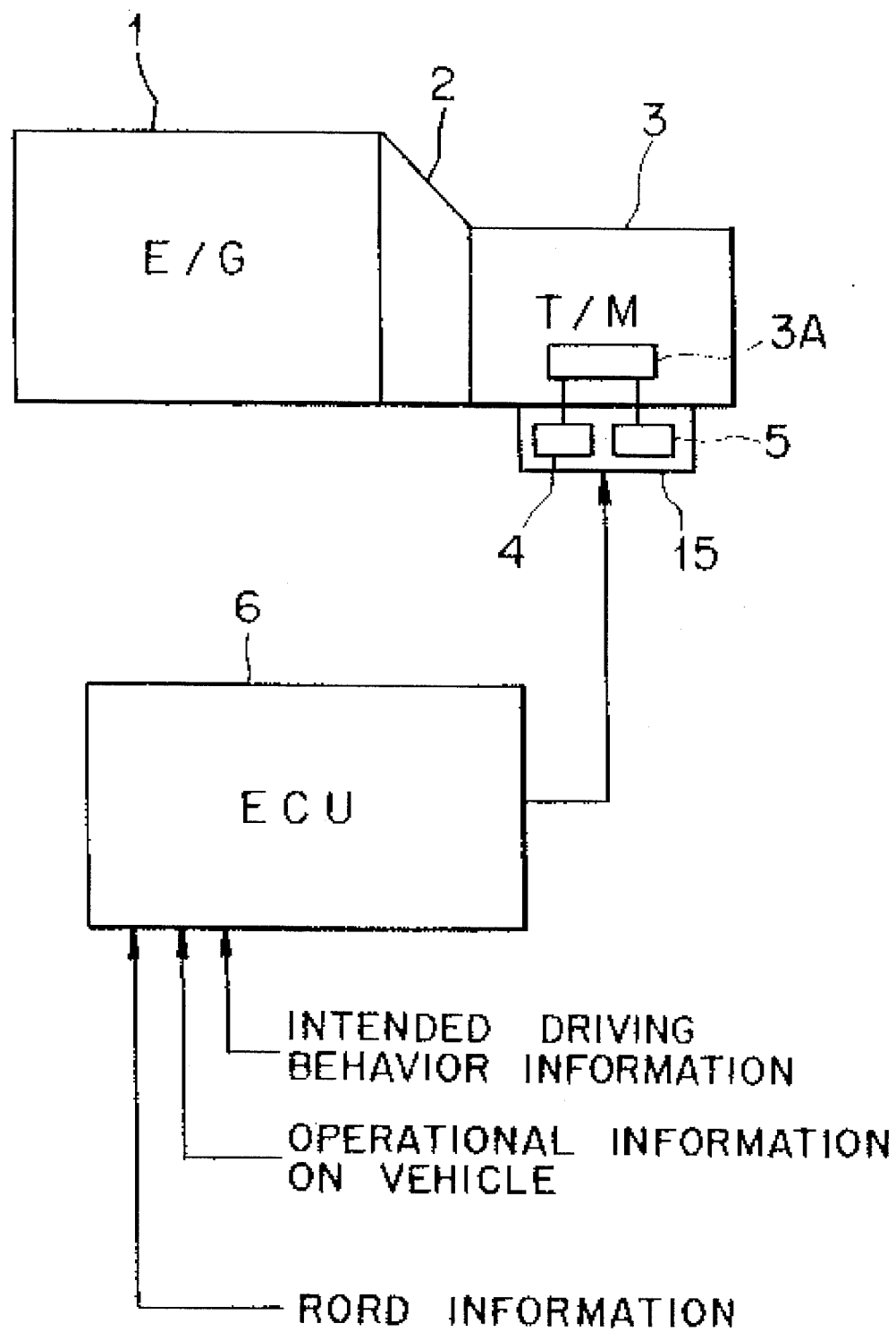
FIG. 2 is a simplified block diagram of the vehicle automatic transmission with the shift control system incorporated therein.

With reference to the accompanying drawings, the shift control system and method according to one embodiment of the present invention will hereinafter be described.
Outline construction of the shift control system and the automatic transmission to be controlled by the shift control system As is illustrated in FIG. 2, a gear transmission (T/M) 3 is connected via a torque converter 2 to an output side of an internal combustion engine (E/G) 1 which is to be mounted on a vehicle. The transmission 3 has, for example, 4-forward/1-reverse speed ranges and can establish desired one of the speed ranges by selectively engaging or disengaging (releasing) plural engaging elements 3A such as brakes and clutches (not shown).

These engaging elements 3A are fed with an engaging force in the form of a hydraulic pressure. To per form a shifting operation of the speed range by changing over the state of engagement of these engaging elements 3A, a speed-range shifting mechanism 4 constructed of directional control valves equipped with a shifting solenoid is arranged. Further, to adjust the engaging force for the engaging elements 3A, engaging force regulating means 5 formed of a hydraulic pressure regulator valve is also arranged. These speed-range shifting mechanism 4 and engaging force regulating means 5 are provided integrally as a single valve unit 15.

Figure 1:
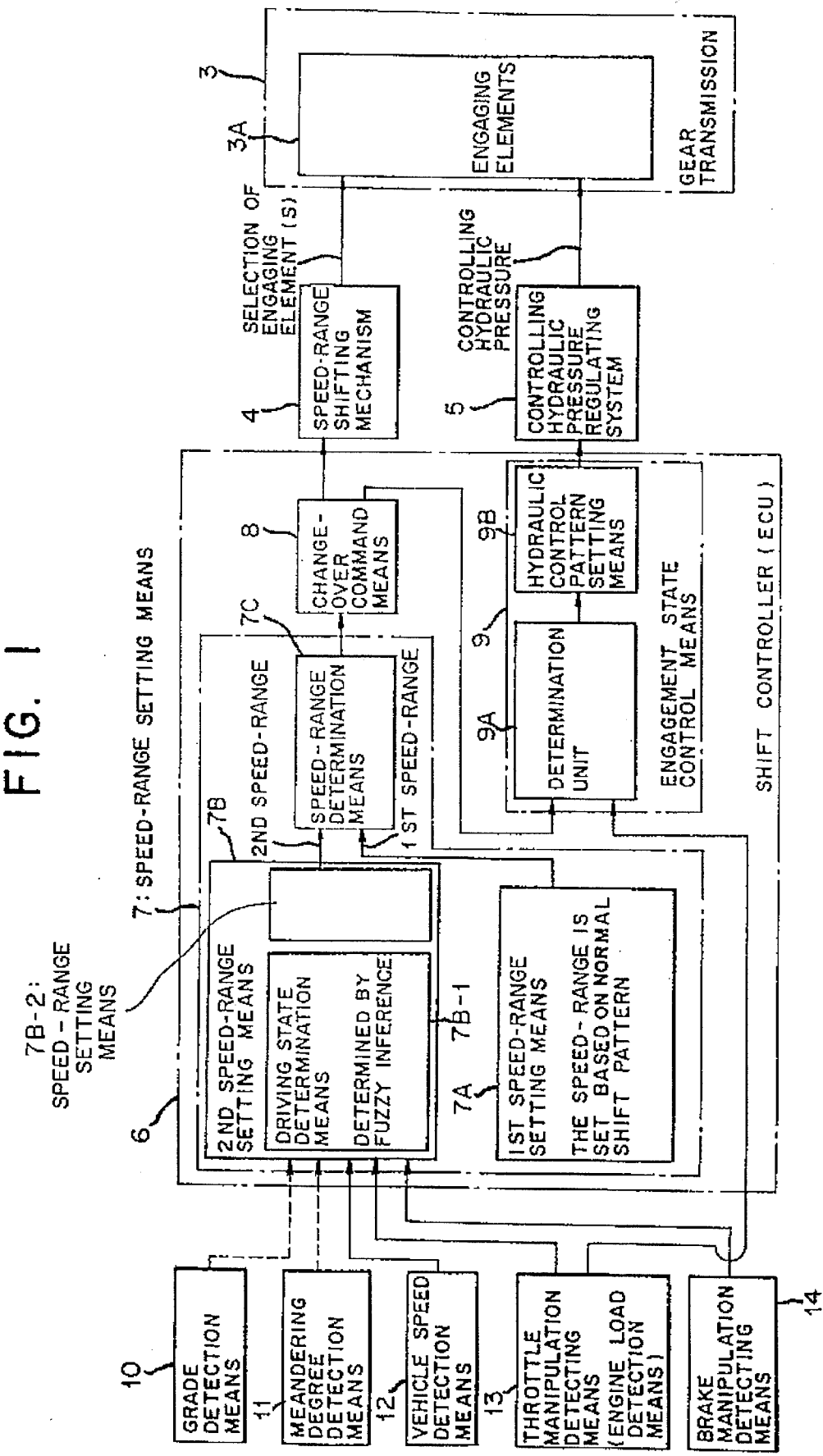
FIG. 1 is a simplified fragmentary block diagram of a shift control system according to one embodiment of this invention, which is suited for use with a vehicle automatic transmission.

An electronic control unit (ECU) 6 is also arranged as a shift control system (which may hereinafter be called the "control means") for controlling the speed-range shifting mechanism 4 and the engaging force regulating means 5.
Construction of essential parts of the shift control system As is illustrated in FIG. 1, ECU 6 is internally provided with a functioning part (speed-range setting means) 7 for selecting optimal one of plural speed range and setting the optimal speed range, a functioning part (change-over command means) 8 for commanding a speed range change-over operation to the speed-range shifting mechanism 4, and a functioning part (engagement state control means) 9 for controlling operation of the engaging force regulating means 5.

The speed-range setting means 7 is provided with two speed-range setting parts, that is, a first speed-range setting part (first speed-range setting means) 7A and a second speed-range setting part (second speed-range setting means) 7B and also with a speed-range determining part 7C for selecting and determining one of values set at these speed-range setting parts 7A,7B, respectively.

Of these, the first speed-range setting part 7A sets an optimal speed range on the basis of a preset normal shift pattern while using vehicle speed information and throttle opening information (engine load information), so that normal automatic shift control can be performed. Accordingly, a vehicle speed sensor 12 as vehicle speed detecting means and a throttle opening sensor 13 as throttle valve operation detecting means are connected to the first speed-range setting part 7A.

The second speed-range setting part 7B, on the other hand, comprises a driving state determining part (driving state determination means) 7B-1 for determining the state of driving of a vehicle by fuzzy inference on the basis of information on the state of operation of the vehicle, information on driving behavior intended by the driver and information of conditions of a road on which the vehicle is running and a speed-range setting means 7B-2 for selecting optimal one of plural speed ranges on the basis of the results of the determination by the driving state determination means 7B-1 and setting the optimal speed range. The second-speed-range setting part 7B therefore sets the optimal speed range on the basis of the fuzzy inference. In the present embodiment, information on the vehicle speed is fed as information on the state of operation of the vehicle, information on the throttle opening and information on brake manipulation are fed as information on driving behavior intended by the driver, and information on the grade and meandering degree of the road are fed as information on the conditions of the road, whereby the optimal speed range is set at the second speed-range setting part 7B. To the second speed range setting part 7B, are therefore connected the vehicle speed sensor 12, the throttle opening sensor 13 as the engine load detecting means, a brake switch 14 as the brake manipulation detecting means, grade detection means 10, and meandering degree detection means 11. As the engine load detection means, a sensor for detecting the amount of depression of an accelerator pedal can be used. As the engine load information, it is possible to use the opening of the throttle valve or the rate of the change in the opening of the throttle valve or the amount of depression of the accelerator pedal or the rate of the change in the amount of depression of the accelerator pedal.

The speed-range determining part 7C usually selects the optimal speed range which has been set based on the normal shift pattern at the first speed-range setting part 7A, but when the speed range set by the fuzzy inference at the second speed range setting part 7B is lower than the speed range set at the first speed-range setting part 7A, selects as the optimal speed range the speed range set at the second speed range setting part 7B.

When the optimal speed range selected by the speed-range setting means 7 is different form the current speed range, the change-over command means 8 commands a speed-range shifting operation to the speed-range shifting mechanism 4.

The engagement state control means 9 controls the level of a hydraulic pressure which causes the engaging element 3A to engage. In the present embodiment, two hydraulic control patterns (in other words, engaging force control patterns) are provided as indicated by characteristic lines Ⓐ and Ⓑ in FIG. 3(*b*). One of these patterns is chosen for use in the control.

Figure 3:
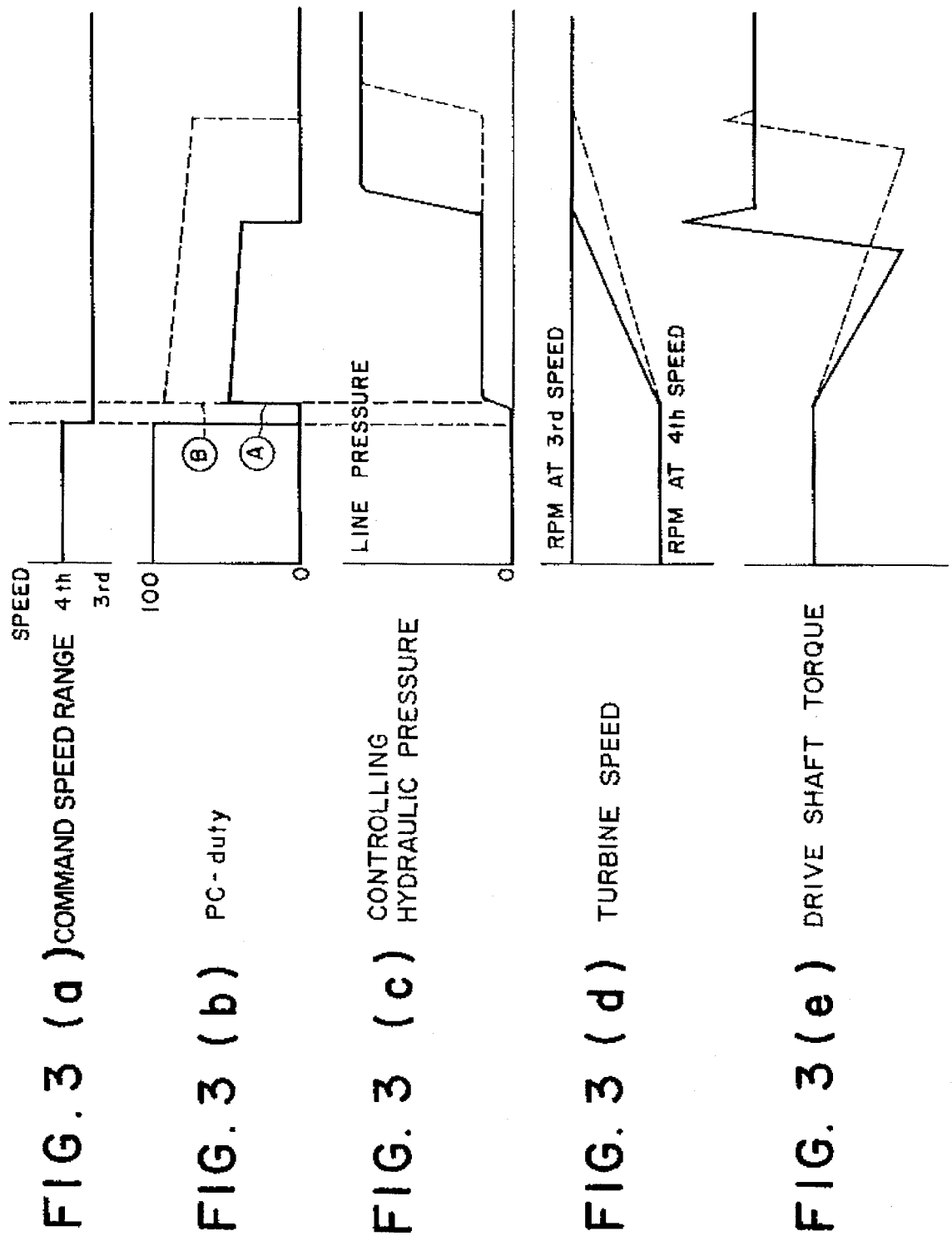
FIGS. 3(a) through 3(e) are diagrams showing characteristics of control of an engaging force (hydraulic control) by the shift control system.

Incidentally, FIG. 3(*a*) illustrates the state of speed range, FIG. 3(*b*) the hydraulic control duty, FIG. 3(*c*) the control hydraulic pressure, FIG. 3(d) the rotational speed of a turbine, and FIG. 3(e) the torque of drive shaft. The hydraulic control duty shows how much the control hydraulic pressure is reduced. The control hydraulic pressure becomes smaller as the hydraulic control duty becomes greater, and the control hydraulic pressure becomes greater as the hydraulic control duty becomes smaller.

The hydraulic control pattern Ⓐ places importance on the response of shifting. It is designed in such a way that the initial engaging pressure is high and the subsequent period during which the engaging pressure gradually increases is short to ensure rising of the engaging pressure to a line pressure in a short time. The hydraulic control pattern Ⓑ as the second hydraulic pressure feeding pattern, on the other hand, places importance on the smoothness of shifting. It is designed in such a way that the initial engaging pressure is lower than that of the pattern Ⓐ, the subsequent period during which the engaging pressure gradually increases is longer than that of the pattern Ⓐ, and the timing of an increase to the line pressure becomes slower than that of the pattern Ⓐ.

The engagement state control means 9 normally sets the hydraulic pressure control pattern Ⓐ which places importance on the response of shifting, but upon performance of a downshift on a downhill road (hereinafter called a "downhill downshift") which the driver can hardly predict, sets the hydraulic pressure control pattern Ⓑ which places importance on the smoothness of shifting.

For this purpose, the engagement state control means 9 is provided with a determination unit 9A for determining if a downhill downshift is about to be performed, and also with a hydraulic pressure control pattern setting unit (hydraulic pressure control pattern setting means) 9B for setting a hydraulic pressure control pattern (engaging force control pattern) on the basis of the determination by the determination unit 9A.

A downhill downshift is a downshift for applying an engine brake on a downhill road. Such a downhill downshift is performed when the speed range set by the fuzzy inference at the second speed range setting means 7B is selected as an optimal speed range.

Figure 20:
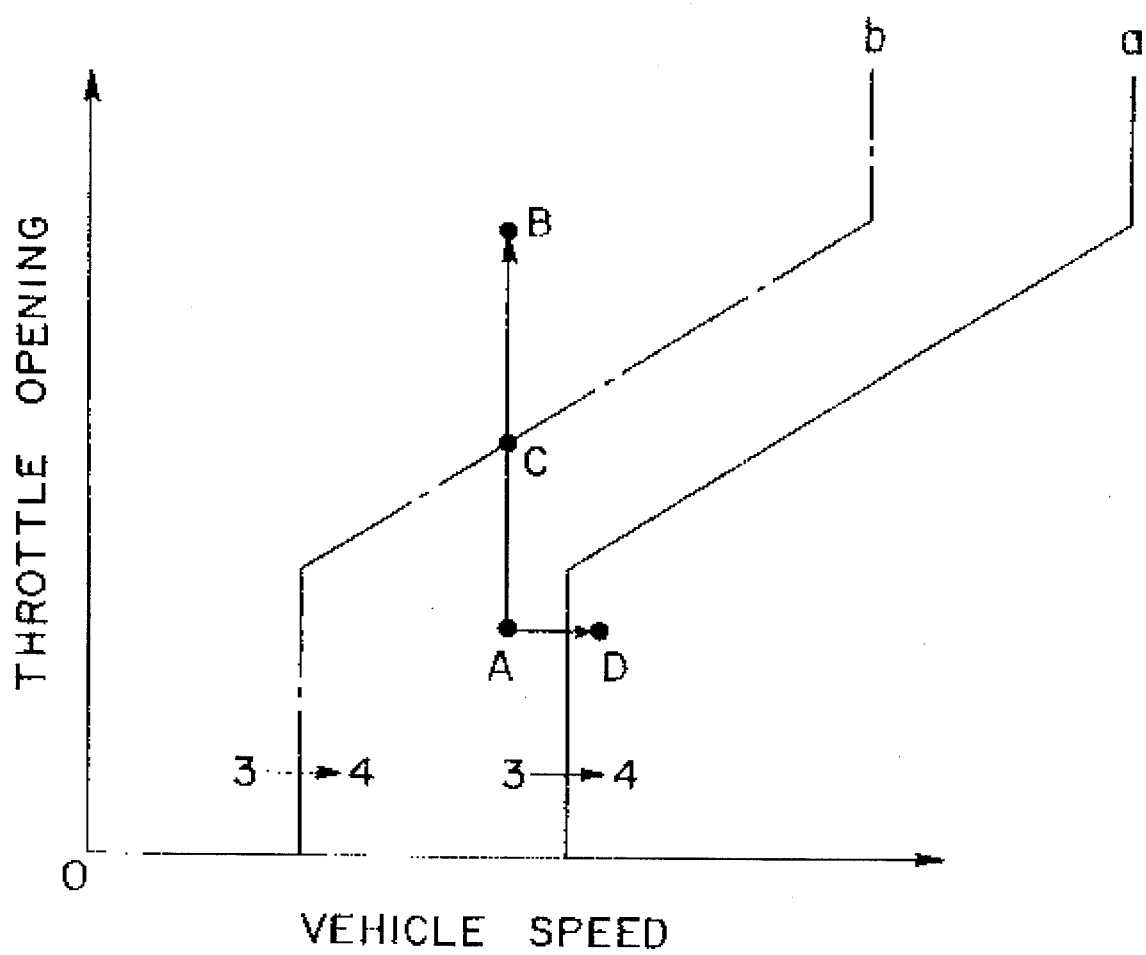
FIG. 20 is a diagram (control map) showing one example of a shift command according to conventional shift control system and method for a vehicle automatic transmission and also illustrating problems sought for solution by the present invention.

Described specifically, the vehicle may be accelerated on a downhill road even if the driver does not manipulate the throttle valve, in other words, does not depress the accelerator pedal, and the vehicle speed may increase, for example, from point A to point D as viewed in FIG. 20. Here, an upshift from 3rd speed to 4th speed is commanded by the first speed range setting means 7A as the speed increases passing across the upshift line a as indicated in the diagram. If the vehicle is running on a downhill road, however, it is 2nd stage that is to be selected using the fuzzy inference. Therefore a downshift from 3rd speed to 2nd speed is conversely commanded to obtain an engine brake. This downshift is allowed to take precedence so that the downshift is commanded.

As is appreciated from the foregoing, a downshift is performed on a downhill road even if the driver does not depress the accelerator pedal (i.e., does not manipulate the throttle valve). The driver cannot expect this downshift operation, and is rather surprised by a shift shock which takes place accompanying the downshift operation.

The determination unit 9A performs determination on the basis of a change-over command signal (shift position control signal) outputted through the change-over command means 8, shift mode information available from the speed range determining means 7C via the change-over command means 8, and throttle opening information (accelerator pedal depression amount information) from the throttle opening sensor (or accelerator pedal depression amount sensor) 13. When the speed range shifting command is a downshift to the speed range selected according to the fuzzy inference by the second speed range setting means 7B and the throttle valve is not being manipulated (the accelerator pedal is not being depressed), it is determined whether a downhill downshift should be commanded or not.

The hydraulic pressure control pattern setting unit 9B usually sets the hydraulic pressure control pattern Ⓐ which places importance on the response of shifting, but when the shifting of the speed range is determined to be a downhill downshift at the determination unit 9A, sets the hydraulic pressure control pattern Ⓑ which places importance on smoothness of shifting.

Basic concept of the shift control

According to the shift control system of this embodiment, it is designed to perform control of a downhill downshift as a part of its shift control. Besides the downhill downshift control mode, various other shift control modes are included. By the speed-range setting means 7, especially by the second speed range setting means 7B, speed ranges can be set in various modes.

The basic concept of control of shifting by the present shift control system will next be described with reference to FIG. 4. The shift control modes are divided, for example, into five modes. Provided ready for use are a normal mode (MODE 0) for flat roads such as streets in urban regions, an uphill cornering mode (MODE 1) for frequently bent uphill slopes in mountainous regions, a downhill weak engine brake mode (MODE 2) for gentle downhill slopes where a weak engine brake is needed, a downhill strong engine brake mode (MODE 3) for steep downhill slopes and downhill slopes of large meandering degrees where a strong engine brake is needed, and a straight uphill slope road (MODE 4) for long straight uphill slopes. The downhill weak engine brake mode (MODE 2) and the downhill strong engine brake mode (MODE 3) correspond to the downhill road downshift mode described above.

A shift pattern for running on flat roads such as streets in urban regions is provided ready for use in the normal mode 0. Using this shift pattern for flat road running, an optimal speed range is set in accordance with an accelerator pedal position (i.e., throttle opening), which corresponds to an engine load, and a vehicle speed in the normal mode 0. This is not different at all from the conventional shift control. When this mode 0 is selected, a speed range is set according to a shift control program which is separately provided ready for use.

A shift pattern, which is different from the shift pattern for flat road running, is provided ready for use in the uphill cornering mode 1. Details of this shift pattern will be described subsequently herein. This shift pattern is set so that even if the accelerator pedal is released partly or fully upon entering a corner, an upshift is hardly allowed to take place. Shift hunching is therefore prevented.

In the downhill weak engine brake mode 2 and the downhill strong engine brake mode 3 which correspond in combination to the downhill road downshift mode, the speed range is forcedly set at 3rd speed range and 2nd speed range, respectively, so that an appropriate degree of engine brake is automatically applied to prevent the vehicle from entering a corner at an excessively high speed on a downhill slope and also to reduce the number of braking operations.

In the straight uphill slope mode 4, the speed range is set at a position lower by one stage from the current shift position to make sure to provide a necessary drive force. As a downshift operation is automatically performed in this straight uphill slope mode 4, a necessary drive force can be retained to prevent shift hunching. Shift control in this mode 4 is effective especially for small-displacement vehicles.

According to the shift control system of this embodiment, optimal one of these control modes is selected by conducting fuzzy inference on the basis of various fuzzy input variables, which indicate the state of operation of the vehicle, the driving behavior intended by the driver and the conditions of the road, and a membership function (in the form of a Cripps set). Based on the optimal control mode so selected, a fuzzy shift position is set. This setting method of a fuzzy shift position is different from the setting method that a speed range is set by directly inferring all shift positions for running in urban regions and mountainous regions according to fuzzy inference. The shift control system of this invention therefore requires fewer rules for the selection of an optimal control mode so that the membership function can be simplified.

Figure 4:
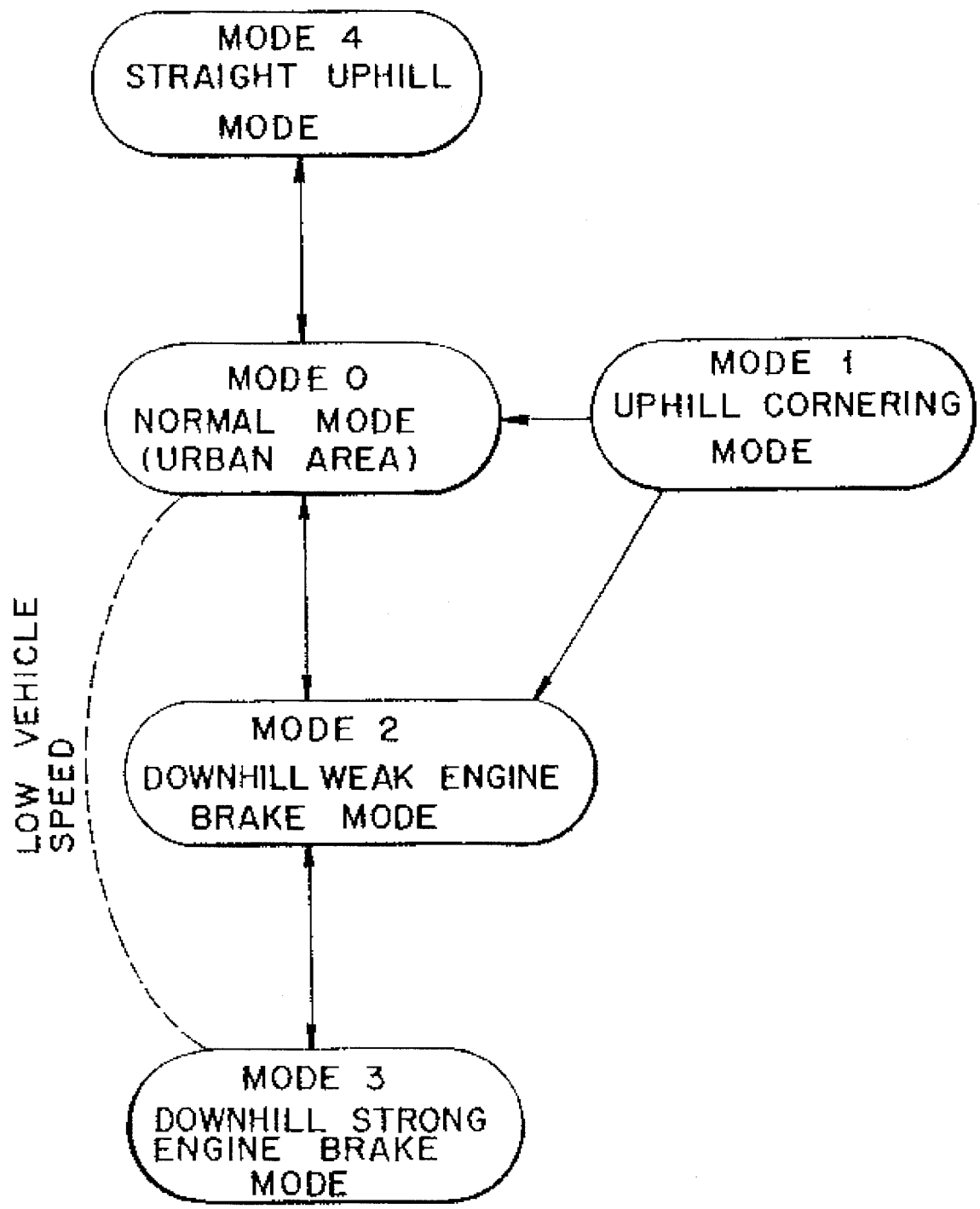
FIG. 4 is a diagram illustrating correlations among individual control modes performed upon control of shifting by the shift control system.

Incidentally, each of the arrows shown in FIG. 4, which are placed between the individual control modes, indicates the direction in which the control mode can be changed over from the current control mode. Assuming by way of example that the current mode is the uphill cornering mode (MODE 1), it is possible to return from MODE 1 to the normal mode 0 or to directly change over from MODE 1 to the downhill weak engine brake mode 2. MODE 1 however cannot be changed directly to the straight uphill road mode 4 or the downhill strong engine brake mode 3. To do this, the change must be performed by way of MODE 0 or MODE 2, respectively.

Shift control programs

As has been described above, the second speed-range setting means 7B computes a fuzzy shift position, and based on the results of the computation, fuzzy shift control is performed by ECU 6. Procedures of shift control by various means in ECU 6 are conducted in accordance with such a program as shown, for example, in the flow charts of FIGS. 5 through 11 and FIGS. 14 through 18. Thus, the control procedures by the various means in ECU 6 will hereinafter be described by specifically referring to these flow charts. Where the normal mode 0 is selected by the fuzzy shift control, the shift control in the normal mode 0 is executed in accordance with a shift control program separately provided for the normal mode.

Main routine

Figure 5:
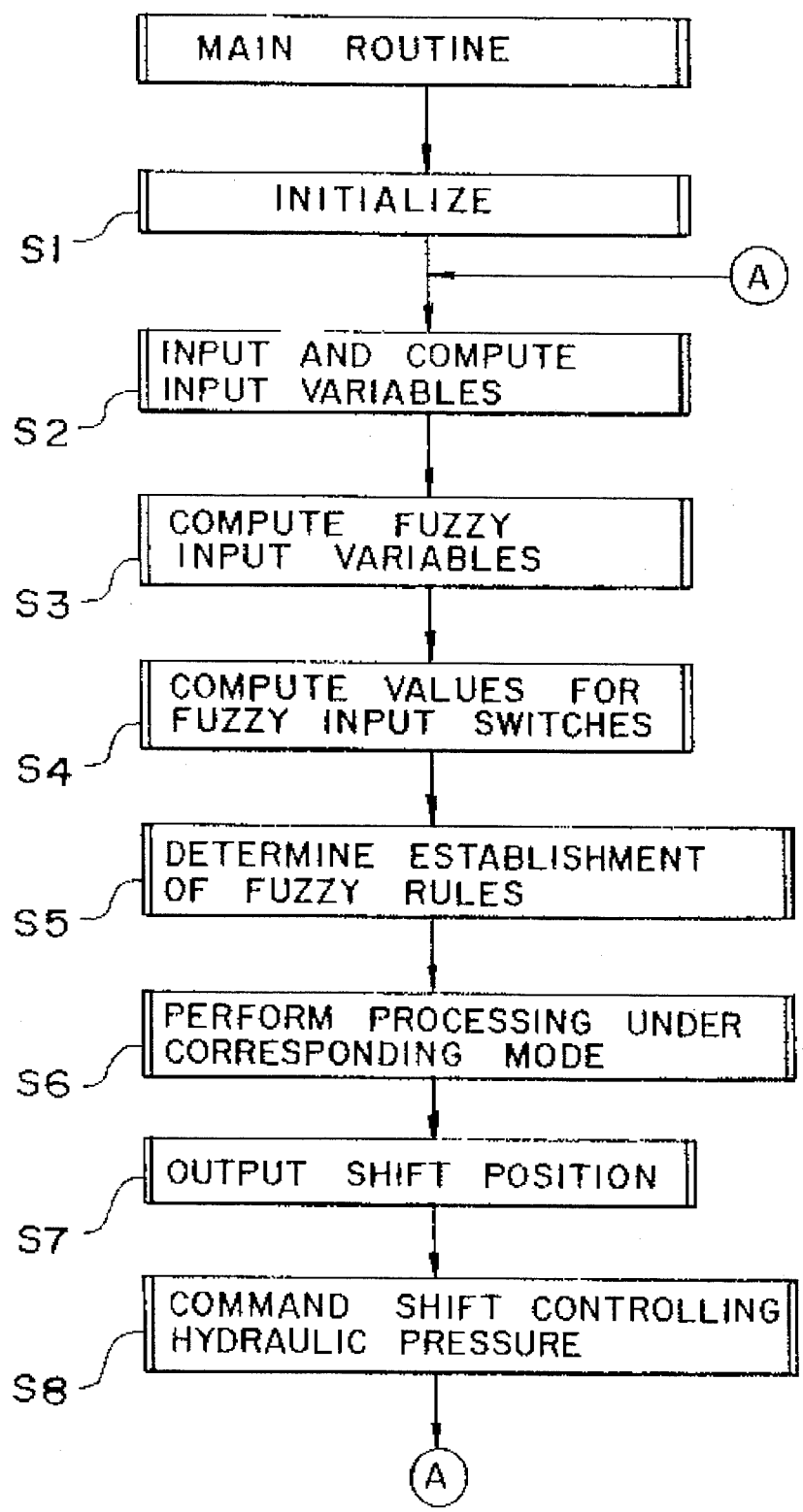
FIG. 5 is a flow chart of a main routine, which shows procedures of fuzzy shift control by the shift control system (namely, FIG. 6 is a flow chart of a rule establishment determining routine according to the fuzzy shift control by the shift control system.
Figure 6:
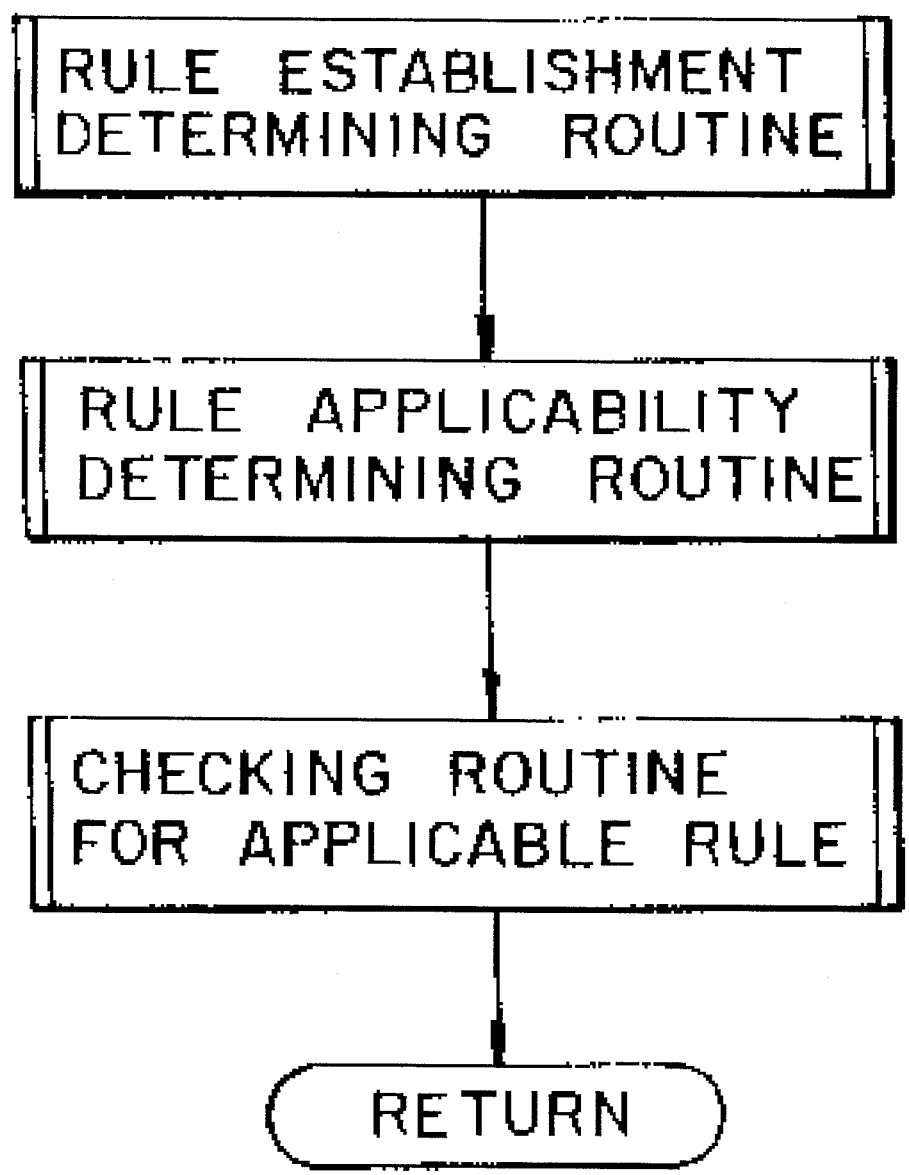

Referring first to FIG. 5, a description will now be made of the main routine (general flow) of the fuzzy shift control program. This program is composed of an initial processing routine in which control variables and various stored values are set at initial values, a routine in which input variables from various sensors and the like are inputted and computed, a routine in which fuzzy input variables are computed from the input variables inputted or computed, a routine in which values of various fuzzy input switches are set based on the input variables, a routine in which establishment or non-establishment of a fuzzy rule is determined, a routine provided corresponding to a control mode, in which subtraction is being performed, so that a fuzzy shift position is set based on the fuzzy rule so established, a routine in which a shift position is outputted based on the fuzzy shift position so set, and a routine in which a shift control hydraulic pressure is commanded.

The initial processing routine, executed at the beginning of execution of the main program, for example, is executed only once immediately after an ignition key switch (not shown) has been turned on. Upon completion of the execution of the initial processing routine, the subsequent routines are repeatedly executed at predetermined cycles (for example, 50 msec).

Input and computation routine for input variables

In this routine, input variables which are needed for the shift control are inputted from the above-described various sensors 10–14, a fuel control device, or the like. These input variables may be either those obtained by simply subjecting detection signals, which have been inputted from the sensors, to filtering and A/D conversion or those determined from such input variables by computation. Upper and lower limits may be provided for inputted values of such input variables as needed, so that values outside the corresponding upper or lower limits are limited to the values of the upper or lower limits. Input variables required for the shift control are presented in Table 1.

TABLE 1

| Input variable | Unit | Label |
| --- | --- | --- |
| Vehicle speed | km/hr | V0 |
| Longitudinal acceleration | g | Gx |
| Number of engine revolutions | rpm | Nc |
| A/N | % | A/N |
| Steering wheel angle | deg | θw |
| Accelerator pedal position | % | APS |
| Speed ratio of torque converter | % | e |
| Shift position | | SPOS |
| OD switch | | OD |
| Commanded speed range | | SHIFT0 |
| Mode 0 computation | | SHIFT1 |
| Lateral acceleration | g | Gy |
| Engine torque | kg · m | ETRQ |
| Brake switch | | BRK |

Among the above input variables, the vehicle speed V0 is computed from a wheel speed detected by a wheel speed sensor. The steering wheel angle θw is set at its predetermined upper limit (for example, 360°) when its absolute value exceeds the upper limit or at its predetermined lower limit (for example, 10°) when its absolute value is smaller than the lower limit. The lateral acceleration Gy is set at its upper limit when the vehicle speed V0 exceeds a predetermined value (for example, 10 km/hr), at 0 when the lateral acceleration is smaller than a predetermined value (for example, 10°), and at a predetermined upper limit when the lateral acceleration exceeds the upper limit. The lateral acceleration Gy is computed based on the following formula (A1):

$$Gy=(\theta w \cdot Cp)/[Lw \cdot (A+V0^2)] \times C1 \tag{A1}$$

Computation of fuzzy input variables

Eleven fuzzy input variables FV(0) to FV(10) required for fuzzy inference, which are shown in Table 2, will be computed next. These fuzzy input variables FV(0) to FV(10) can be classified, as shown in Table 2, into information on driving behavior intended by the driver, information on the state of operation of the vehicle and information on roads. Although the steering wheel angle information classified under the road information also falls under the information on driving behavior intended by the driver, the degree of meandering of the road is determined from the steering wheel angle information so that the steering wheel angle information will be handled as road information. Likewise, the lateral acceleration information classified under the road information can also be classified to the vehicle operation information. The degree of meandering of the road can however be determined from the lateral acceleration information, so that the lateral acceleration information will be handled as road information.

TABLE 2

| Input variable | Class* | Unit | Label |
| --- | --- | --- | --- |
| Vehicle speed | VOI | km/hr | FV(0) |
| Longitudinal acceleration | VOI | g | FV(1) |
| Steering wheel operation amount | RI | d · deg | FV(2) |
| Per-brake deceleration | IDBI | km/hr | FV(3) |
| Throttle opening | IDBI | % | FV(4) |
| Accelerator pedal depressing speed | IDBI | %/s | FV(5) |
| Weight-grade resistance | RI | kgf | FV(6) |
| Engine torque margin | VOI | kgm | FV(7) |
| 2-second vehicle speed difference | VOI | km/hr | FV(8) |
| Absolute value of steering wheel angle | RI | deg | FV(9) |
| Absolute value of lateral acceleration | RI | g | FV(10) |

*VOI: Vehicle operation information
RI: Road information
IDBI: Intended driving behavior information Among the fuzzy input variables shown in Table 2, the steering wheel operation amount FV(2) is an actual value of the product of the steering wheel angle θw and the lateral acceleration Gy. The computation of this actual value is conducted at predetermined intervals (for example, every second), so that an average of actual values in a predetermined past period (for example, 20 seconds) is employed as a parameter indicating the busyness (frequency) of steering operations. For the computation of this steering wheel operation amount FV(2), the following formulas (A2),(A3) can be employed.

$$FV(2) = [(1/T)\int(\theta w)^2 \cdot (Gy)^2 dt]^{0.5} \quad (A2)$$

$$= \left[ (1/20) \sum_{i=1}^{20} (\theta wi)^2 \cdot (Gyi)^2 \right]^{0.5} \quad (A3)$$

As this steering wheel operation amount FV(2) reflects both the steering wheel angle and the lateral acceleration as factors, the steering wheel operation amount FV(2) takes a greater value at a higher vehicle speed when the vehicle turns the same corner and at the same vehicle speed, takes a greater value as the corner radius R becomes smaller. Where the steering wheel angle is the same, the lateral acceleration becomes greater with vehicle speed, resulting in a greater steering wheel operation amount FV(2). As is appreciated from the above, the steering wheel operation amount FV(2) can be regarded as an index including the frequency of steering operations and the driver's tension.

With respect to the steering wheel operation amount FV(2) obtained from 20 samples per second, values obtained upon running on a standard street, running at a medium speed on a meandering road and running on a meandering zigzag road will now be compared. These values are 3.0 (g.deg) or smaller upon running on the street, 10–30 (g.deg) upon running at the medium speed on a meandering road, and 40 (g.deg) or greater upon running on the meandering zigzag road. Marked differences are therefore observed in the steering wheel operation amount FV(2) when running on these roads, so that runnings on these roads can be distinguished.

Even if a rule indicating an uphill road or a downhill road is established, for example, by running over a bump or as a result of input of other fuzzy input variables despite running on a street in an urban region, the running can still be determined accurately as running on an urban street insofar as the steering wheel operation amount FV(2) is equal to or smaller than the above-described value, i.e., 3.0 (g.deg).

The per-brake deceleration FV(3), the fourth fuzzy input variable in Table 2, indicates how many km/hr the vehicle speed V0 has been reduced by a single braking operation. In this embodiment, the per-brake deceleration FV(3) can be computed by the following formula (A4), from a vehicle speed VST stored immediately before the braking operation and a fuzzy input variable FV(0) of a vehicle speed computed this time:

$$FV(3)=VST-FV(0) \quad (A4)$$

The accelerator pedal depressing speed FV(5) is determined by converting a difference in the throttle opening FV(4), which is detected at predetermined intervals (for example, every 0.25 second), into a difference per second.

Further, the value RK of the weight-grade resistance FV(6) is determined by subtracting aerodynamic resistance, rolling resistance and acceleration resistance from an engine drive force. This can be expressed by the following formula (A5):

$$RK = \text{engine drive force} - \\ \text{aerodynamic resistance} - \\ \text{rolling resistance} - \\ \text{acceleration resistance} \quad \ldots (A5)$$

The engine drive force (hereinafter referred to as "TE") in the above formula (A5) can be computed by the following formula (A6):

$$TE=T_E(\eta_E)\cdot t(e)\cdot \eta \cdot i_T \cdot i_F/r \quad (A6)$$

where $T_E(\eta_E)$: engine torque (kg.m) after subtraction of an exhaust loss, t(e): torque ratio of the torque converter 2, η: transmission efficiency of the gear transmission 3, $i_F$: gear ratio of a differential, and r: dynamic load radius of a tire.

The engine torque $T_E(\eta_E)$ is calculated from an air/fuel ratio (A/N) of the engine 1 and the number (Ne) of engine revolutions, t(e) is read from a torque ratio table stored beforehand as a function of speed ratios (e) of the torque converter, and as η, $i_T$, $i_F$ and r, predetermined values set as constants are used.

The aerodynamic resistance in the above formula (A5) can be computed by the following formula (A7):

$$\text{Aerodynamic resistance} = \rho a \cdot S \cdot Cd \cdot V^2/2 \quad (A7)$$
$$= C2 \cdot V^2$$

where

ρa: the density of air, which is given by a constant determined by the surrounding air temperature, S: the projected area of a front face of the vehicle, Cd: drag coefficient, which is given by a constant.

C2 computed from these constants is also a constant. The aerodynamic resistance is therefore computed as a function of the vehicle speed (V).

The rolling resistance in the above formula (A5) can be computed by the following formula (A8):

$$\text{Rolling resistance}=R0+(CF^2/CP) \quad (A8)$$

where

R0: rolling resistance upon free rolling,

CF: cornering force, and

CP: cornering power.

R0 can be computed by the following formula (A9):

$$R0 = \mu r \cdot W \quad (A9)$$

where
μr: rolling resistance, and
W: vehicle weight.

The second member in the right-hand side of the above formula (A8) is a contributing member by cornering resistance where the side skid angle is small. Studying the cornering resistance by a two-wheel model under the assumption that the ratio of a load borne by a front wheel to that borne by a rear wheel is constant (for example, 0.6:0.4 in terms of the front-to-rear ratio) and the cornering powers of the front and rear wheels are CPf and CPr (constant values), the cornering resistance can be computed by the following formula (A10):

$$\text{Cornering resistance} \quad (A10)$$
$$= \{0.6W/2) \cdot GY\}^2 \times 2/CPf + \{(0.4W/2) \cdot GY\}^2 \times 2/CPr$$
$$= C3 \times W^2 \times GY^2$$

where
C3: constant, and
GY: lateral acceleration.

This lateral acceleration GY can be computed based on the steering wheel angle $\theta_H$ detected by a steering angle sensor (not shown) and the vehicle speed V detected by a vehicle speed sensor (detection means) 12.

By incorporating such cornering resistance in the computation of the rolling resistance, the weight-grade resistance upon significantly turning the steering wheel can be calculated accurately. If the cornering resistance were not incorporated, the grade of a meandering downhill road would be calculated smaller than its actual grade during cornering and a flat road would be estimated as an uphill slope. The incorporation of cornering resistance can avoid such potential problems.

The acceleration resistance in the above formula (A5) can be computed by the following formula (A11):

$$\text{Acceleration resistance} = (W + \Delta W) \cdot GX \quad (A11)$$

where
W: the vehicle weight described above,
ΔW: rotating part equivalent weight, and
GX: lateral acceleration.

The lateral acceleration GX can be computed based on the vehicle speed V detected by the vehicle speed sensor. The rotating part equivalent weight ΔW, on the other hand, can be computed by the following formula (A12):

$$\Delta W = W0 + \{Ec + Fc(ir \cdot i_F)^2\} \quad (A12)$$

where
W0: complete vehicle curb weight,
Ec: tire rotating part equivalent weight percentage,
Fc: engine rotating part equivalent weight percentage,
ir: the gear ratio of the gear transmission 3, and
$i_F$: the gear ratio of the differential.

At the grade detection means 10, the weight-grade resistance RK is calculated by the formula (A5) on the basis of the values calculated by the formulas (A6) to (A12) as described above.

Computation of values of the fuzzy input switches

Upon determination of fuzzy rules, the fuzzy input switches SW(0) to SW(8) compute the applicability of these fuzzy rules like the membership function of the fuzzy input variables. The values of the fuzzy input switches SW(0) to SW(8) are however expressed by digital values so that they are separated as switch inputs from the fuzzy input variables. Table 3 illustrates these fuzzy input switches:

TABLE 3

| Fuzzy input switch | Label |
| --- | --- |
| Control mode | SW(0) |
| Grade resistance, large state | SW(1) |
| Grade resistance, non-negative state | SW(2) |
| Grade resistance, non-negative, large state | SW(3) |
| Meandering flag | SW(4) |
| Throttle opening, large state | SW(5) |
| Throttle opening, medium state | SW(6) |
| 2nd-speed engine brake time high acceleration flag | SW(7) |
| 3rd-speed engine brake time high acceleration flag | SW(8) |

The fuzzy input switch SW(0) indicates the selected control mode and its value is set by the below-described processing in that mode.

When the weight-grade resistance continuously remains not smaller than a predetermined value CFV 61 for a predetermined time (for example, 2.5 seconds) within a predetermined period (for example, 5 seconds), the vehicle is determined to be running on an uphill slope. Value 1 is therefore set at the fuzzy input switch SW(1) to store that the grade resistance is in a large stage.

When the weight-grade resistance continuously remains greater than a predetermined negative value (−CFV 62) for a predetermined time (for example, 2.5 seconds), the vehicle is determined to have returned from running on a downhill slope to running on a flat road. Value 1 is therefore set at the fuzzy input switch SW(2) to store that the grade resistance is non-negative.

When the weight-grade resistance continuously remains not greater than a predetermined value (CFV 63) for a predetermined time (for example, 5 seconds), the vehicle is determined to have gone through with running on an uphill slope. Value 1 is therefore set at the fuzzy input switch SW(3) to store that the grade resistance is non-negative and large.

When the steering wheel operation amount FV(2) continuously remains not smaller than a predetermined value (CFV 21) for a predetermined time (for example, 5 seconds), the vehicle is determined to be running on a meandering road. Value 1 is therefore set at the fuzzy input switch SW(4) to store this running state. Incidentally, determination of leaving of the vehicle from the meandering road is effected by using a predetermined value (CFV 22) smaller than the above-described predetermined value (CFV 21) and determining that the steering wheel operation amount FV(2) has become smaller.

When the throttle opening FV(4) continuously remains greater than a predetermined value CFV 41 (for example, 25%) for a predetermined time (for example, 0.6 seconds), the throttle opening is determined to be large. The fuzzy input switch SW(5) is therefore set at value 1 to store that the throttle opening is large.

When the throttle opening FV(4) continuously remains greater than a predetermined value CFV 42 (for example 25%), which has been set at a value smaller than the above-described predetermined value CFV (25%), for a predetermined time (for example, 0.6 seconds), the throttle opening is determined to be intermediate. The fuzzy input switch SW(6) is therefore set at value 1 to store that the throttle opening is intermediate.

The fuzzy input switch SW(7) is used to set a 3rd-speed engine brake time high acceleration flag. When the throttle opening FV(4) is equal to or greater than a predetermined opening CFV 43 (for example, 40%) immediately after the fuzzy input switch SW(5) has been set at 1, the fuzzy input switch SW(7) is set at 1 to store that the driver intends to make a high acceleration on a downhill slope.

The fuzzy input switch SW(8) sets a 2nd-speed engine brake time high acceleration flag. When the throttle opening FV(4) is equal to or greater than the predetermined opening CFV 43 (for example, 40%) immediately after the fuzzy input switch SW(6) has been set at 1, the fuzzy input switch SW(8) is set at 1 to store that the driver intends to make a high acceleration on a downhill slope.

Determination of rule establishment

According to the shift control by the shift control system according to this invention for a vehicle automatic transmission, the establishment of one of fuzzy rules to be described below is determined and a control mode corresponding to the rule so established is selected. The establishment of each fuzzy rule requires that all the following conditions are met.

(1) Values of fuzzy input switches relevant to the rule are all equal to the corresponding values for establishment.

(2) Fuzzy input variables relevant to the rule all fall within the range of a designated membership function.

(3) The rule is continuously found applicable at least a predetermined number of times.

Table 4 to Table 6 will be presented below. Of these, Table 4 shows fuzzy input switches relevant to individual fuzzy rules and their values for establishment. Table 5 presents fuzzy input variables relevant to the individual fuzzy rules and an outline of the individual fuzzy rules. Each membership function is designed as a Cripps set in this embodiment, and fuzzy inference is performed depending upon whether each fuzzy input variable is within a predetermined range of the corresponding membership function. Control modes to be selected upon confirmation of the establishment of the individual fuzzy rules are shown in Table 6.

TABLE 4

| Rule | Fuzzy switch input |
| --- | --- |
| 0 | SW(1) = 1 |
| 1 | SW(1) = 1 |
| 2 | — |
| 3 | — |
| 4 | — |
| 5 | — |
| 6 | SW(0) = 2 |
| 7 | SW(0) = 2 |
| 8 | SW(0) = 2 and SW(4) = 1 |
| 9 | SW(0) = 2 and SW(2) = 1 |

TABLE 5

| Rule | Fuzzy input variable |
| --- | --- |
| 0 | [FV(0) small] [FV(4) > 10] [FV(5) > 5] [FV(8) small] [FV(9) large] |
| 1 | [FV(0) small] [FV(4) > 10] [FV(5) > 5] [FV(8) small] [FV(10) large] |
| 2 | [FV(0) medium] [FV(2) large] [FV(5) small] [FV(6) negative] [FV(8) large] |
| 3 | [FV(0) medium] [FV(2) large] [FV(3) large] [FV(6) small] [FV(8) negative] |
| 4 | [FV(0) medium] [FV(4) small] [FV(6) negative & large] [FV(8) large] |
| 5 | [FV(0) medium] [FV(1)small] [FV(4) large] [FV(5) large] [FV(7) small] |

TABLE 5-continued

| Rule | Fuzzy input variable |
| --- | --- |
| 6 | [FV(4) small] [FV(6) negative & very large] [FV(8) large] |
| 7 | [FV(3) large] [FV(4) small] [FV(6) negative & very large] |
| 8 | [FV(4) small] [FV(6) negative] [FV(10) large] |
| 9 | [FV(4) > 3] [FV(6) small] [FV(9) small] |

TABLE 6

| Rule | Mode to be entered after establishment of rule |
| --- | --- |
| 0 | Mode 1 |
| 1 | Mode 1 |
| 2 | Mode 2 |
| 3 | Mode 2 |
| 4 | Mode 2 |
| 5 | Mode 4 |
| 6 | Mode 3 |
| 7 | Mode 3 |
| 8 | Mode 3 |
| 9 | Mode 0 |

Table 6 shows the procedures for the determination of establishment of the fuzzy rule described above. With respect to each of rules, it is first determined in the rule applicability determining routine whether the rule is applicable or not. It is then confirmed in the checking routine for the applicable rule if the routine found applicable in the rule applicability determining routine is applicable at least a predetermined number of times continuously.

Figure 7:
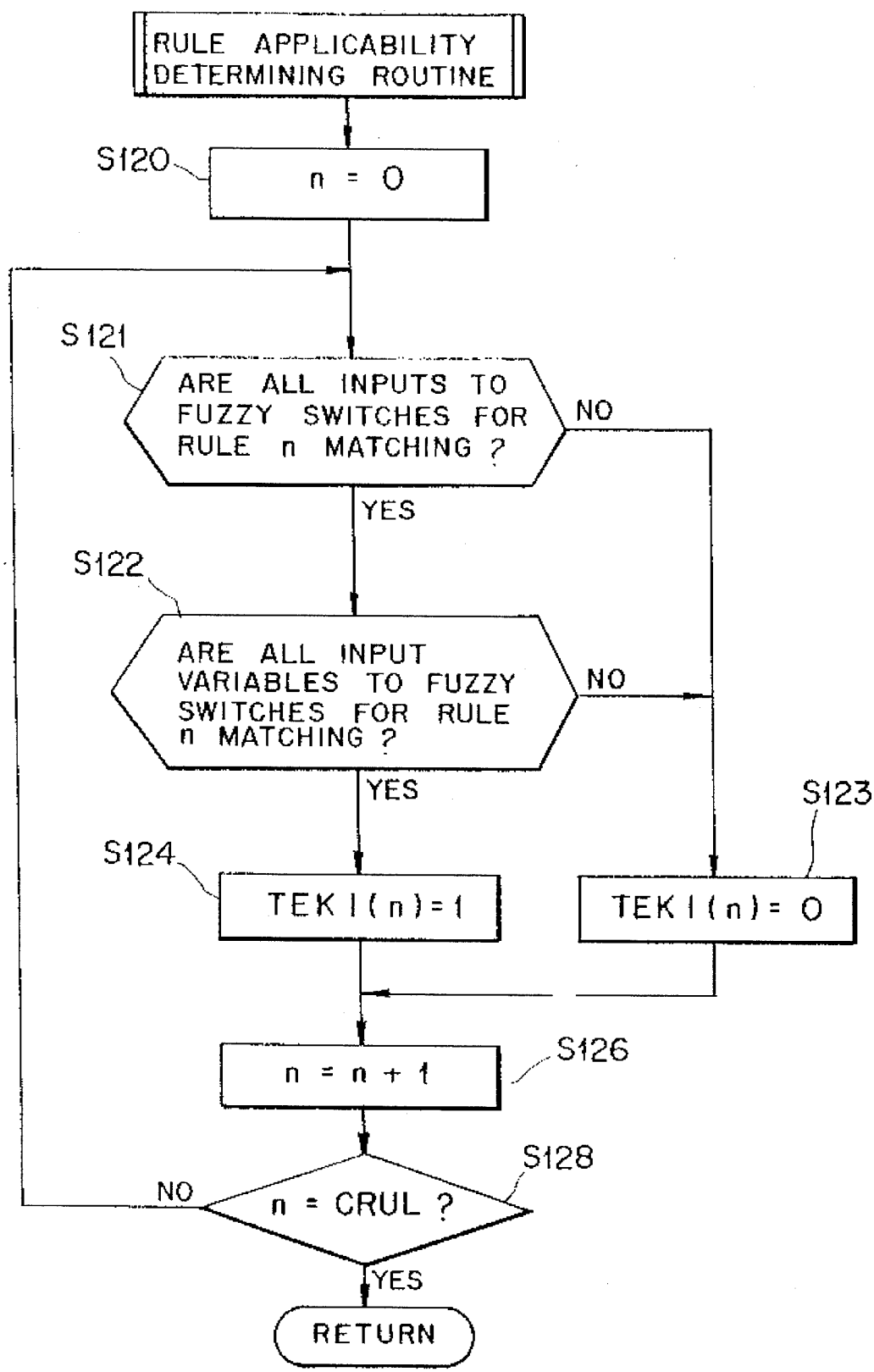
FIG. 7 is a flow chart illustrating procedures of determination of applicability of a rule established according to the fuzzy shift control by the shift control system (namely, a shift control method according to the one embodiment of the present invention for the vehicle automatic transmission)

FIG. 7 illustrates more specific procedures of the rule applicability determination. When this routine is executed, the speed-range setting means 7 of ECU 6 first resets the program control variable n to value 0 in step S120. It is next determined whether the fuzzy input switches for the rule n are matching (step S121). In the case of the rule 0, for example, it is determined based on Table 4 whether the fuzzy input switch SW(1) is equal to value 1 for establishment or not. In the case of the rule 8, for example, it is determined whether or not the fuzzy input switch SW(0) and the fuzzy input switches SW(4) are equal to values 2 and 1 for establishment, respectively. It is hence determined whether or not each of these rules is established.

If none of fuzzy input switches relevant to the rule n is determined to be matching in step S121, the routine advances to step S123 and value 0 is set as the control variable TEKI(n). If all the fuzzy input switches relevant to the rule n are determined to be matching in step S121, on the other hand, the routine advances to step S122. Here, it is determined whether or not all the fuzzy input variables relevant to the rule n are matching, in other words, fall within prescribed ranges of the membership functions designated by the fuzzy input variables.

As is illustrated in Table 5, for example, the applicability of the five fuzzy input variables is determined under the rule 0 whereas the applicability of four fuzzy input variables is determined under the rule 4. The proposition about whether the fuzzy input variable FV(0) is small, namely, the vehicle speed is low or not is inferred by determining, based on a 0th membership function provided corresponding to the fuzzy input variable, whether or not the fuzzy input variable FV(0) is a value within a range defined by predetermined upper and lower limits (for example, within a range of from 10 km/hr to 55 km/hr). Similarly, the proposition about whether the fuzzy input variable FV(0) is medium, namely, the vehicle speed is medium or not is inferred by determining, based on a 1st membership function provided corresponding to this fuzzy input variable, whether or not the fuzzy input variable FV(0) is a value within a range defined by predetermined upper and lower limits (for example, within a range of from 30 km/hr to 100 km/hr). The relationships between these propositions and membership functions are summarized in Table 7.

influence of the tension of execution of the control mode, noise, etc. to the determination of establishment of each rule.

When the checking routine for one applicable rule has been completed, the program control variable n is incremented by value 1 in step S136, followed by the determination of whether the variable n is equal to a predetermined value CRUL (the value corresponding to the number of the rule) or not (step S138). Until the variable value n becomes

TABLE 7

| Proposition | Membership function | Range of fuzzy input variable | Remarks |
|---|---|---|---|
| Is the vehicle speed low? | 0th | P01L ≦ FV(0) ≦ P01U | P01L < P02L < |
| Is the vehicle speed high? | 1st | P02L ≦ FV(0) ≦ P02U | P01U < P02U |
| Is the longitudinal acceleration large? | 0th | P1L ≦ FV(1) ≦ P1U | |
| Is the steering wheel operation amount large? | 0th | P2L ≦ FV(2) ≦ P2U | |
| Is the brake deceleration degree large? | 0th | P3L ≦ FV(3) ≦ P3U | |
| Is the throttle opening small? | 0th | P41L ≦ FV(4) ≦ P41U | P41L < P42L < |
| Is the throttle opening 3% or greater? | 1th | P42L ≦ FV(4) ≦ P42U | P43L < P44L; |
| Is the throttle opening 10% or greater? | 2nd | P43L ≦ FV(4) ≦ P43U | P41U = P42L; |
| Is the throttle opening large? | 3rd | P44L ≦ FV(4) ≦ P44U | P42U = P43U = P44U |
| Is the accelerator pedal depressing speed low? | 0th | P51L ≦ FV(5) ≦ P51U | P51L < P52L < P53L < P51L < |
| Is the accelerator pedal depressing speed faster than 5%/s? | 1st | P52L ≦ FV(5) ≦ P52U | P52U = P53L |
| Is the accelerator pedal depressing speed high? | 2nd | P53L ≦ FV(5) ≦ P53U | |
| Is the grade resistance negative and very large? | 0th | −MIN ≦ FV(6) ≦ −P61U | −P61U < −P62U |
| Is the grade resistance negative and large? | 1st | −MIN ≦ FV(6) ≦ −P62U | < −P63U |
| Is the grade resistance negative? | 2nd | −MIN ≦ FV(6) ≦ −P63U | |
| Is the engine torque margin small? | 0th | P7L ≦ FV(7) ≦ P7U | |
| Is the 2-second vehicle speed difference small? | 0th | P81L ≦ FV(8) ≦ P81U | P81L < P82L = P82U < P82U |
| Is the 2-second vehicle speed difference large? | 1st | P82L ≦ FV(8) ≦ P82U | |
| Is the absolute value of the steering wheel angle small? | 0th | P91L ≦ FV(9) ≦ P91U | P91L < P92L = P92U < P92U |
| Is the absolute value of the steering wheel angle large? | 1st | P92L ≦ FV(9) ≦ P92U | |
| Is the absolute value of the lateral acceleration small? | 0th | P10L ≦ FV(10) ≦ P10U | P10L < P10U < P11L < P11U |
| Is the absolute value of the lateral acceleration large? | 1st | P11L ≦ FV(10) ≦ P11U | |

Figure 8:
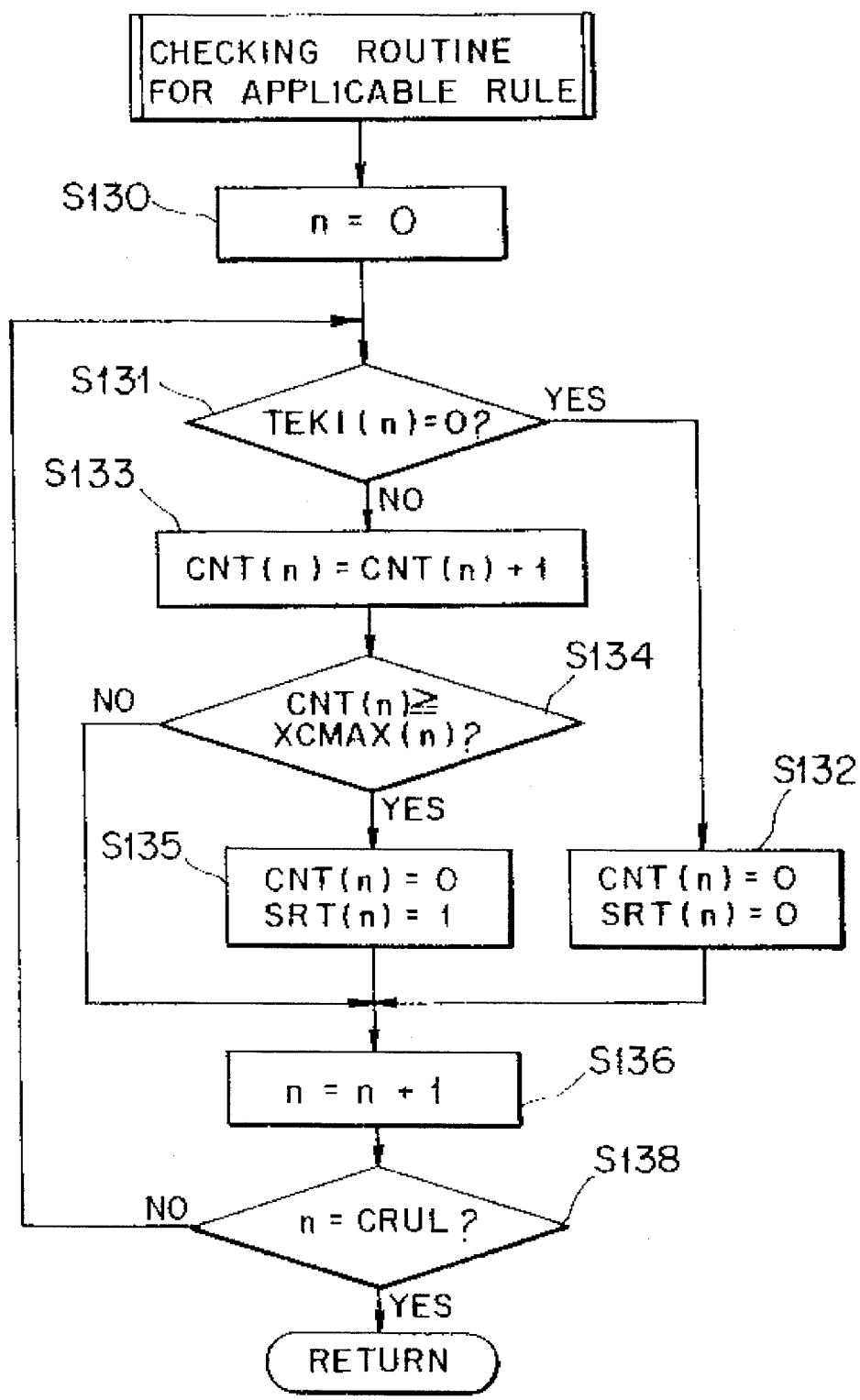
FIG. 8 is a flow chart depicting checking procedures for a rule established according to the fuzzy shift control by the shift control system (namely, a shift control method according to the one embodiment of the present invention for the vehicle automatic transmission)

FIG. 8 is a routine for checking whether or not the rule determined to be applicable is determined to be matching at least a predetermined number of times continuously. ECU 6 first resets the program control variable n to value 0 in step S130. In step S131, it is next determined whether the control variable TEKI(n) corresponding to the rule n designated in Step S130 is value 0 or not. If the control variable TEKI(n) is determined to be value 0 in step S131, the rule n is not applicable and the routine then advances to step S132, where the counter CNT(n) for rule n is reset to value 0 and value 0 is set as the control variable SRT(n) to store non-establishment of the rule n. The routine then advances to step S136 which will be described subsequently herein.

If the results of the determination in step S131 is negative and the control variable TEKI(n) corresponding to the rule (n) is not value 0, the routine advances to step S133, where after the counter value CNT(n) is incremented by value 1, it is determined whether or not the counter value CNT(n) has reached a predetermined value XCMAX(n) set corresponding to the rule n (step S134). If the counter value CNT(n) has not reached the predetermined value XCMAX(n), the routine advances to step S136 without making any change to the variable value SRT(n). The predetermined value XCMAX(n) can be set at a suitable value in view of equal to the predetermined value CRUL, the above-described step S131 onwards are executed repeatedly to perform the checking routine for applicable rule with respect to all the rules. When the checking routine for applicable rule has been completed with respect to all the rules and the determination in step S138 has given positive results, the routine is ended.

When the above routine is repeated and the control variable TEKI(n) corresponding to the specific rule n is continuously set at value 1, the counter value CNT(n) is incremented whenever the routine is executed and eventually reaches the predetermined value XCMAX(n). When the determination in step S134 gives positive results, step S135 is executed so that the counter CNT(n) is reset at value 0 and value 1 is set as the control variable SRT(n) to store the establishment of the rule n.

Processing routine in each mode

Figure 9:
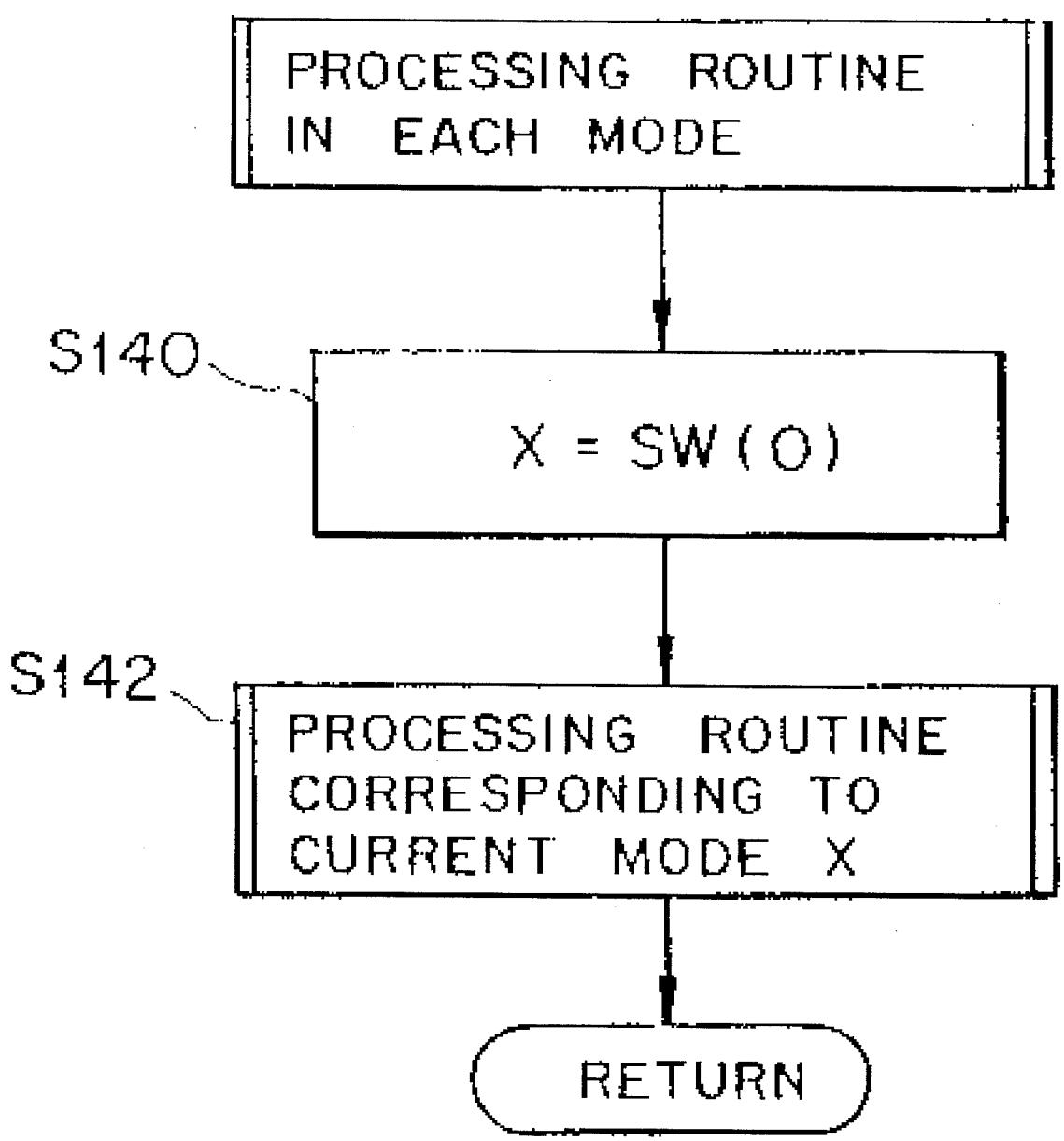
FIG. 9 is a flow chart showing procedures of processing in each mode according to the fuzzy shift control by the shift control system (namely, a shift control method according to the one embodiment of the present invention for the vehicle automatic transmission)

When the established rule has been determined as described above, ECU 6 next perform processing in each mode by the procedures shown in FIG. 9. Specifically, the value of the fuzzy input switch SW(0) is first set as the program variable X in step S140. In other words, the current control mode is specified. A processing routine corresponding to the current control mode X is executed (step S142).

According to this shift control, five control modes are provided including mode 0 to mode 4. The program variable X, namely, the fuzzy input switch SW(0) is set at one of 0–4. The current control mode X in step S142 is therefore one of mode 0 to mode 4 and a processing routine is set for each control mode. Specifically, there are provided a processing routine for the current mode 0, a processing routine for the current mode 1, a processing routine for the current mode 2, a processing routine for the current mode 3, and a processing routine for the current mode 4. Processing in each of the current modes will hereinafter be described specifically.

Processing routine in the current mode 0

Figure 10:
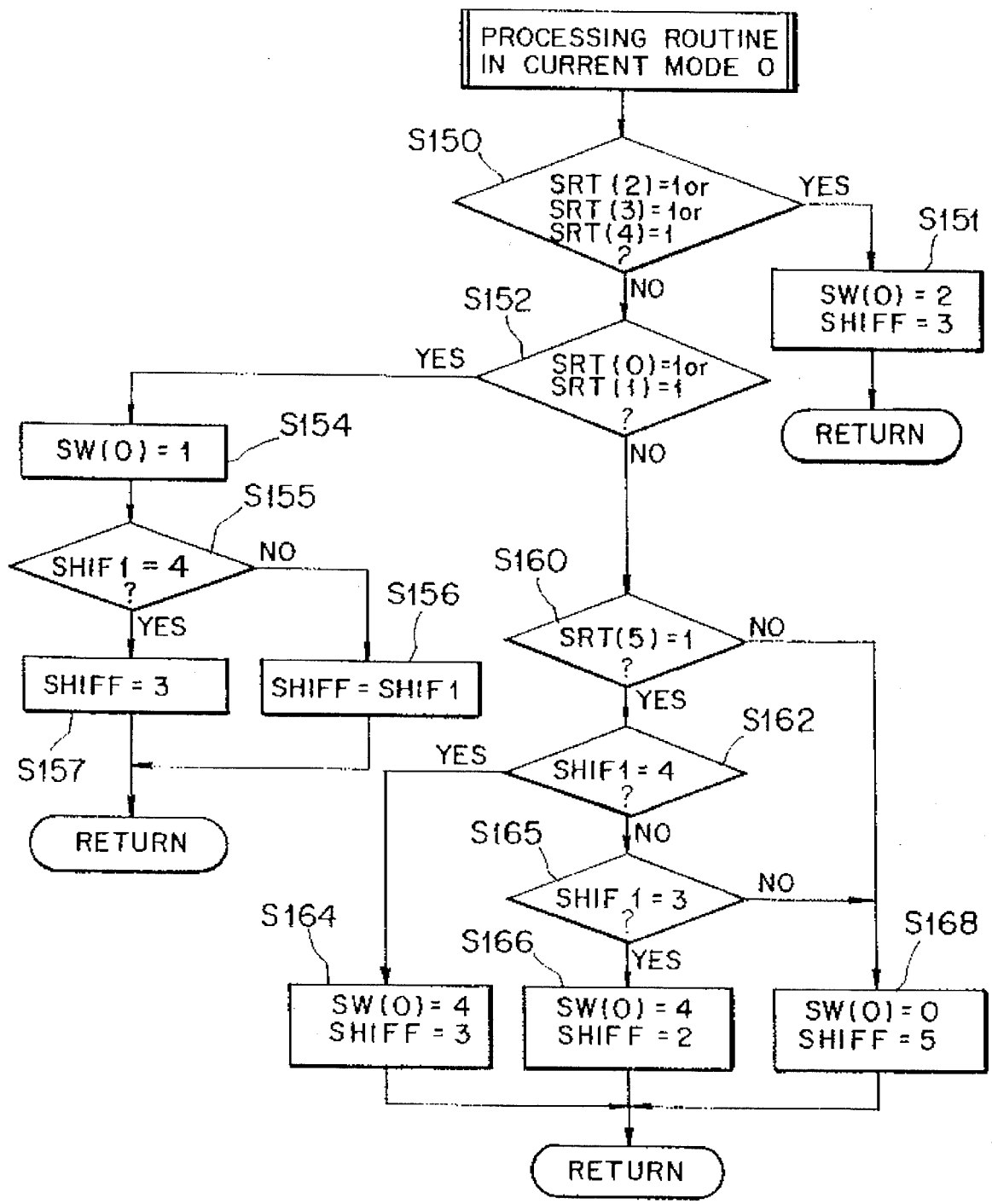
FIG. 10 is a flow chart showing procedures of processing by the shift control system where the current mode is 0 (namely, a shift control method according to the one embodiment of the present invention for the vehicle automatic transmission)

When the current shift control is performed in the control mode 0 (normal mode 0), a fuzzy shift position variable SHIFF is set in accordance with the flow chart of FIG. 10. Incidentally, the control mode 0 sets a speed range by using a shift pattern for ordinary flat road running as described above. As is illustrated in FIG. 4, it is possible to change from this control mode 0 to the mode 1, the mode 2 and the mode 4.

According to this processing routine, it is determined in step S150 whether or not any of the control variables SRT(2), SRT(3) and SRT(4) is value 1 to indicate the storage of establishment of the corresponding rule. These variables SRT(2), SRT(3) and SRT(4) are to store the establishment of the corresponding rules 2, 3 and 4. Establishment of any of these rules as shown in Table 6 indicates that the routine should advance to the mode 2. Where the results of the determination in step S150 are "YES", the routine therefore advances to step S151 so that the fuzzy input switch SW(0) is set at value 2 and the fuzzy shift position variable SHIFF is set at value 3. The routine is then ended. The mode 2 is, as described above, a mode to make the vehicle run down at the 3rd speed range on a downhill slope while applying an engine brake.

Where none of the control variables SRT(2), SRT(3) and SRT(4) is value 1 and the determination in step S150 has resulted in "NO", step S152 is performed to determine whether any of the control variables SRT(0) and SRT(1) is value 1 or not. These variables are to store the establishment of the rules 0 and 1, respectively. As is illustrated in Table 6, establishment of any of these rules indicates that the routine should advance to the mode 1. Where the determination in step S152 has resulted in "YES", the routine advances to step S154 and the fuzzy input switch SW(0) is set at value 1.

The routine then advances to step S155, where it is then determined whether the variable SHIF1, which indicates a shift position (a speed range computed in the mode 0) determined based on the shift pattern provided for use in the mode 0, is value 4 indicating the 4th speed range. Where this determination has resulted in "YES", value 3 is set as the fuzzy shift position variable SHIFF to forcedly downshift to the 3rd speed range, whereby this routine is ended.

Where the determination is step S155 has resulted in "NO", on the other hand, the routine advances to step S156 to set a variable value SHIF1 as the fuzzy shift position variable SHIFF, whereby this routine is ended.

Incidentally, the mode 1 is the uphill cornering mode as shown in FIG. 4, in which a speed range is determined using a shift pattern extending in to regions in which the vehicle is driven at the 2nd and 3rd speed ranges as will be described subsequently herein.

Upon changing from the mode 0 to the mode 1, a forced downshift to the 3rd speed range is commanded when the vehicle is being driven at the 4th speed range. In the course of this downshift operation, the shift pattern is switched over from the shift pattern for the normal mode 0 to the shift pattern for the uphill cornering mode 1. When the vehicle is being driven at a speed range other than the 4th speed range, the shift pattern is changed over while maintaining the speed range.

Where any of the control variables SRT(2), SRT(3) and SRT(4) is not value 1 and the determination in step S152 has resulted in "NO", the routine advances to step S160 to determine whether the control variable SRT(5) is 1 or not. This variable is to store the establishment of the rule 5 and as is shown in Table 6, the establishment of the rule 5 indicates that the mode 4 should be entered. When the determination in step S160 has resulted in "YES", the routine therefore advances to step S162, where it is then determined whether or not the shift position variable SHIF1 determined by the shift pattern provided for use in the mode 0 is value 4 indicating the 4th speed range. Where the determination has resulted in "YES", the routine advances to step S164, where the fuzzy input switch SW(0) is set at value 4 and to perform a forced downshift to the 3rd speed range lower by one stage than the current speed range, value 3 is set as the fuzzy shift position variable SHIFF. The routine is hence ended.

When the determination in step S162 has resulted in "NO", on the other hand, the routine advances to step S165, where it is then determined whether or not the shift position variable SHIF1 is value 3 indicating the 3rd speed range. When the results of the determination are "YES", the routine advances to step S166, where the fuzzy input switch SW(O) is set at value 4 and to perform a forced downshift to the 2nd speed range lower by one stage than the current speed range, value 2 is set at the fuzzy shift position variable SHIFF. The routine is hence ended.

In the mode 4, that is, the straight uphill slope mode, the speed range is forcedly downshifted to the 3rd speed range or 2nd speed range when the speed range set by the shift pattern provided for use in the normal mode 0 is the 4th speed range or the 3rd speed range. respectively.

Where the shift position variable SHIF1 is neither value 4 indicating the 4th speed range nor value 3 indicating the 3rd speed range, the routine advances to step S168, where the fuzzy input switch SW(0) is retained at value 0 and the fuzzy shift position variable SHIFF is set at value 5. The routine is thus ended. Setting of the fuzzy shift position variable SHIFF at value 5 means to set the speed range at the 5th speed range. No 5th speed range however exists in this transmission as a matter of fact, so that the shift command by the fuzzy shift position variable SHIFF is ignored and the shift control in the normal mode 0 is continued.

When the control variable SRT(5) is not 1 and the results of the determination in step S160 are "NO", the routine advances to step S168 described above. Accordingly, the fuzzy input switch SW(0) is retained at value 0 and the fuzzy shift position variable SHIFF is set at value 5, so that the shift control in the normal mode 0 is continued. The routine is hence ended.

Processing routine in the current mode 1

Figure 11:
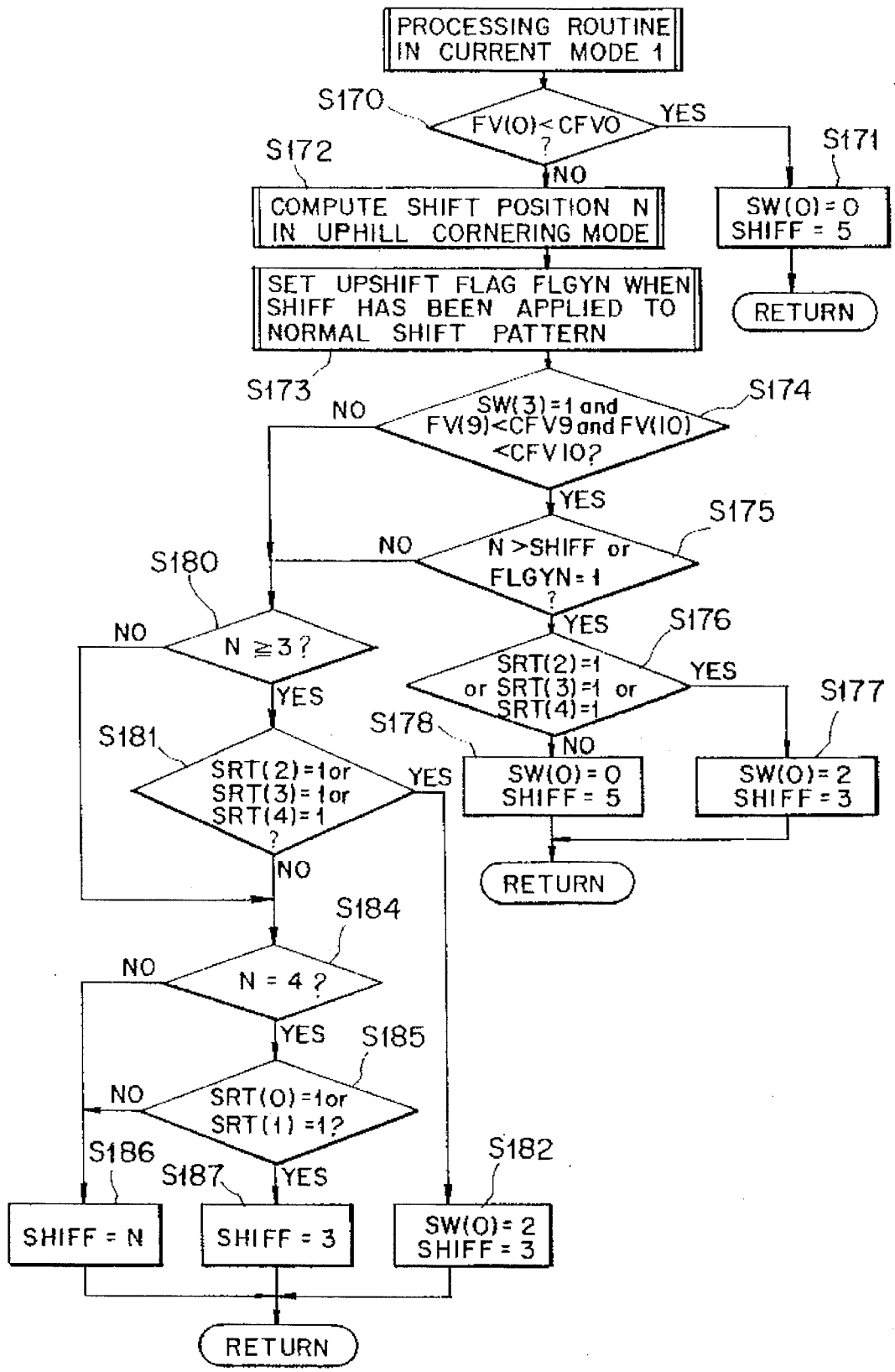
FIG. 11 is a flow chart depicting procedures of processing by the shift control system where the current mode is 1 (namely, a shift control method according to the one embodiment of the present invention for the vehicle automatic transmission)

When the current shift control is performed in the control mode 1, the fuzzy shift position variable SHIFF is set in accordance with the flow chart of FIG. 11. Incidentally, the control mode 1 sets a speed range by using the shift pattern for the uphill cornering mode as described above. From this control mode 1, it is possible to move to the mode 0 or the mode 2 as shown in FIG. 4.

Figure 12:
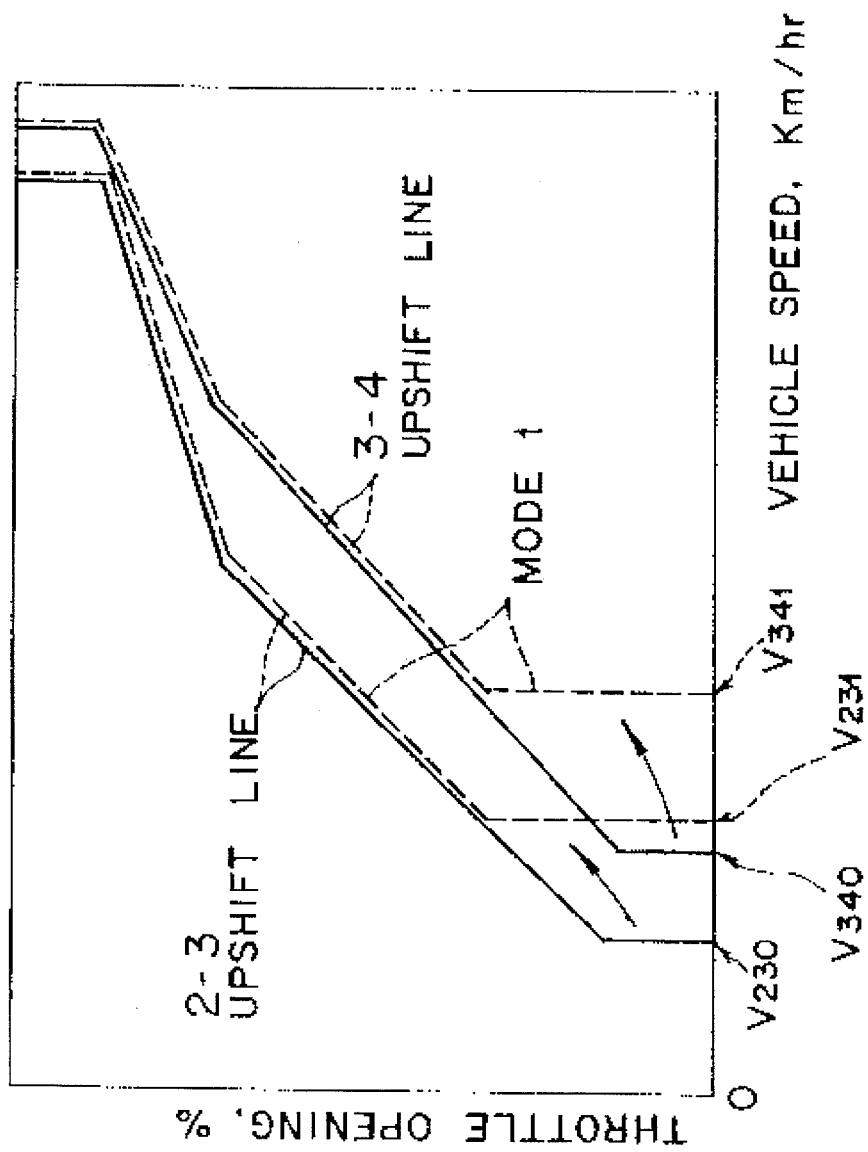
FIG. 12 is a diagram showing upshift lines for control modes 0 and 1, respectively, useful in the fuzzy shift control by the shift control system, which divide shift ranges depending on the throttle opening and the vehicle speed.

According to this processing routine, it is first determined in step S170 whether or not the vehicle speed FV(0) is smaller than a predetermined value CFV0 (for example, 10 km/hr). If the results of this determination are "YES", the routine advances to step S171, where the fuzzy input switch SW(0) is set at value 0 and value 5 is set at the fuzzy shift position variable SHIFF to move to the normal mode 0. When the vehicle speed is low, the normal mode 0 may be executed unconditionally.

Where the vehicle speed FV(0) is higher than a the predetermined value CFV0 (for example, 10 km/hr) and the results of the determination in step S170 are "NO", the routine advances to step S172 and by using the shift pattern for the uphill cornering mode 1, the current shift position N is computed from the detected vehicle speed V0 and throttle opening APS. FIG. 12 illustrates shift patterns for upshifts from the 2nd speed range to the 3rd speed range and also from the 3rd speed range to the 4th speed range. When the control mode changes from the normal mode 0 to the uphill cornering mode 1, each upshift line is changed as indicated by an arrow in the diagram so that the driving region at the 2nd speed range or the 3rd speed range is expanded.

Described specifically, the upshift line (indicated by a solid line) from the 2nd speed range to the 3rd speed range in the normal mode 0 divides two shift regions from each other as a constant vehicle speed line $V_{230}$. With respect to the upshift line (indicated by a broken line) for the uphill cornering mode 1, this constant vehicle speed line moves to a line for a constant vehicle speed $V_{231}$ higher than the vehicle speed $V_{230}$ so that the 2nd speed range region is expanded. Similarly, the upshift line (indicated by a solid line) from the 3rd speed range to the 4th speed range in the normal mode 0 divides two shift regions from each other as a constant vehicle speed line $V_{340}$. With respect to the upshift line (indicated by a broken line) for the uphill cornering mode 1, this constant vehicle speed line moves to a line for a constant vehicle speed $V_{341}$ higher than the vehicle speed $V_{340}$ so that the 3rd speed range region is expanded.

Figure 13:
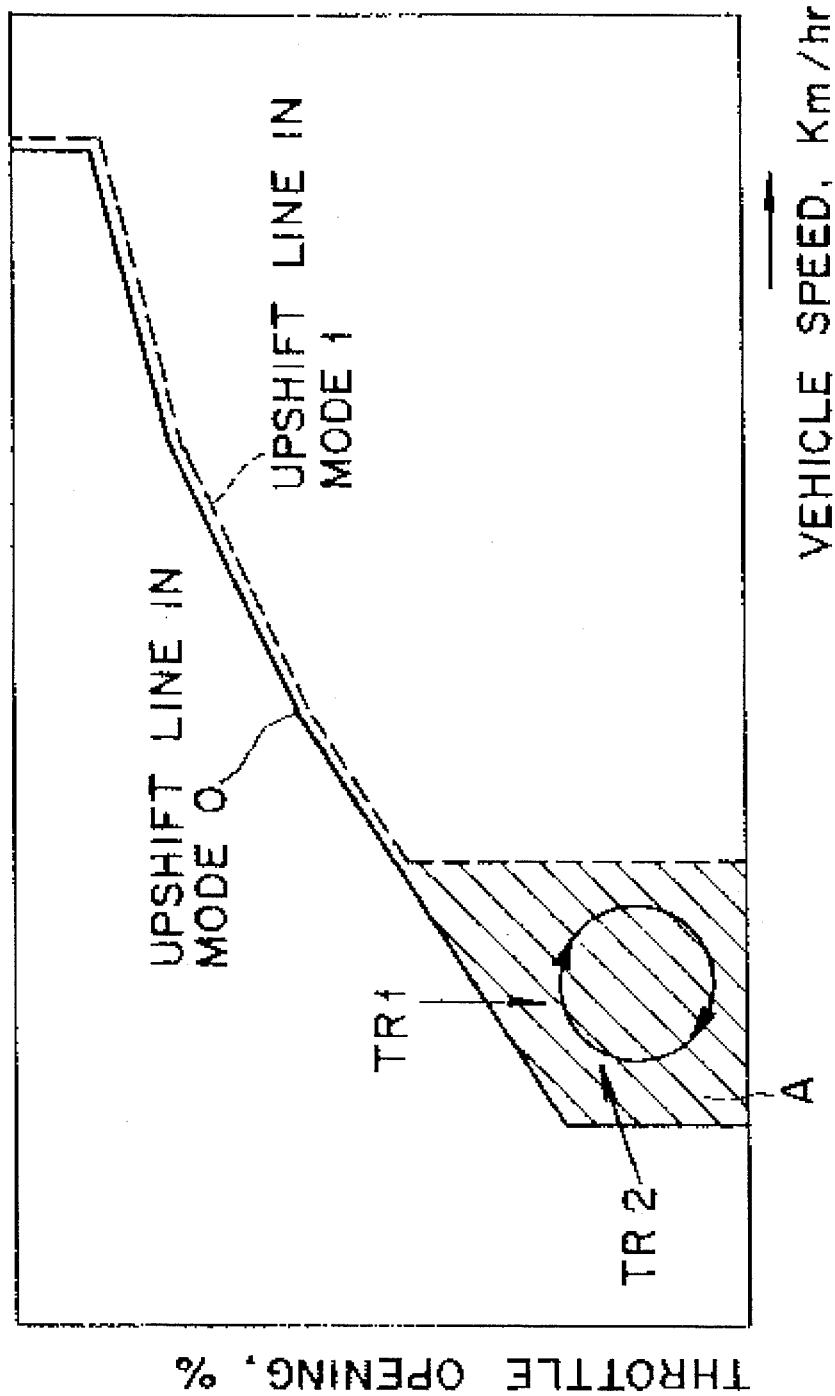
FIG. 13 is a diagram illustrating a shift range which expands as the control mode changes from the control mode 0 to the control mode 1 according to the fuzzy shift control by the shift control system.

The computation of the shift position N in step S172 is conducted using the shift pattern which is indicated by the upshift line in the form of the broken line in FIG. 13. Further, the expansion of the 2nd speed range or 3rd speed range region as a result of the move from the normal mode 0 to the uphill cornering mode 1 is shown by a hatched area A in FIG. 13.

After step S172, the routine next advances to step S173. By computing the shift position from the detected vehicle speed V0 and throttle opening APS while using the normal shift pattern for the normal mode 0, it is then determined whether or not an upshift from the 2nd speed range to the 3rd speed range or from the 3rd speed range to the 4th speed range takes place. Where such an upshift is determined to take place, value 1 is set as the shift number FLGYN.

According to the shift control in the mode 1, the fuzzy input switch SW(0) is set at value 1 and using the fuzzy shift position variable SHIFF, a forced shift to the 3rd speed range or a speed range lower than the 3rd speed range is commanded, as described above.

Setting of value 1 as the shift number FLGYN indicates the existence of a change in the shift position which would perform an upshift if no command were made by the variable SHIFF. This will be explained with reference to FIG. 13. This diagram indicates that by the change in the shift position, the new shift position has entered the area (the hatched area A) which is surrounded by the upshift line (solid line) for the normal mode 0 and the upshift line (broken line) for the mode 1. This entrance of the shift position into the area A may take place when in FIG. 13, the driver has removed his foot from the accelerator pedal and the throttle opening APS has become smaller as indicated by an arrow TR1 or the vehicle speed V has increased as indicated by an arrow TR2.

It is to perform the change from the control mode 1 to another control mode by selecting as the timing for the change the time of crossing of the upshift line that as described above, the shift position N is computed in step S172 or the occurrence or non-occurrence of an upshift is stored in terms of the shift number FLGYN in step S173. By changing the control mode at such timing, it is prevented to give a sense of incongruity to the driver.

Subsequent to step S173, the routine then advances to step S174. It is then determined whether the fuzzy input switch SW(3) is value 1 or not, the steering wheel angle FV(9) is smaller than a predetermined value CFV9 (for example, 50°) or not and the lateral acceleration FV(10) is smaller than a predetermined value CFV10 or not. In other words, it is determined whether the upward grade has ended or not and the road is free of meandering or not. When this determination has resulted in "NO", the routine advances to step S180. If the results of the determination in step S174 are "YES", on the other hand, the routine advances to step S175, where it is then determined whether or not the shift position N determined based on the shift pattern for the uphill cornering mode is greater than the fuzzy shift position variable value SHIFF or whether or not the flag FLGYN indicating the occurrence of an upshift is value 1. If each of these determinations results in "NO", the routine advances to step S180. If one of these determinations results in "YES", the routine advances to step S176.

In step S176, it is determined whether or not any of the control variables SRT(2), SRT(3) and SRT(4) for storing the establishment of the corresponding rules is value 1. These variables are to store the establishment of the rules 2, 3 and 4, respectively, as described above. As shown in Table 6, the establishment of any one of these rules indicates that the mode 2 should be entered. When the results of the determination in step S176 are "YES", the routine advances to step S177, where value 2 is set to the fuzzy input switch SW(0) and value 3 is set as the fuzzy shift position variable SHIFF. The routine is hence ended. The mode 2 is, as described above, a mode for making the vehicle to run down at the 3rd speed range on a downhill slope.

Where each of the control variables SRT(2), SRT(3) and SRT(4) is not value 1 and the results of the determination in step S176 are "NO", the routine advances to step S178, where the fuzzy input switch SW(0) is set at value 0 and the fuzzy shift position variable SHIFF is set at value 5. This routine is hence ended. In this case, the control mode is changed from the uphill cornering mode 1 to the normal mode 0.

Upon advance to step S180, on the other hand, it is then determined whether or not the shift position N computed in step S172 is 3 or higher. When the results of the determination in step S180 are "NO", the routine advances to step S184 which will be described subsequently herein. When the determination in step S180 has resulted in "YES", the routine advances to step S181 which will also be described subsequently herein.

In step S181, it is determined whether or not any of the above-described control variables SRT(2), SRT(3) and SRT(4) is value 1. When the results of the determination in step S181 are "YES", the routine advances to step S182 so that the fuzzy input switch SW(0) is set at value 2 and the fuzzy shift position variable SHIFF is set at value 3. This routine is hence ended. As a result, the mode 2 is executed.

When the results of the determination in either step S180 or step S181 are "NO", it is meant that the uphill cornering mode 1 be continued. In this case, however, it is determined in step S184 and step S185 whether or not the above-described shift position N is equal to 4 and whether or not one of the variables SRT(0) and SRT(1) is value 1. The variables SRT(0) and SRT(1) are to store the establishment of the rules 0 and 1, respectively, as described above. Establishment of one of these rules indicates that the mode 1 should be executed.

When the shift position computed by the shift pattern for the uphill cornering mode 1 is not the 4th speed range or neither the variable SRT(0) nor the SRT(1) is value 1, in other word, when the results of the determination in either step S184 or step S185 are "NO", the routine advances to step S186 and the fuzzy shift position variable SHIFF is then set at value N. This routine is hence ended.

When the shift position N is 4 and either the variable SRT(0) or the SRT(1) is value 1, the shift control in the uphill cornering mode is performed again in the same mode 1, whereby value 3 is set as the fuzzy shift position variable SHIFF to achieve a downshift from the 4th speed range to the 3rd speed range.

When the shift control in the uphill cornering mode is executed, the upshift line is moved so that upon entering a corner of an uphill road, an upshift operation is hardly performed even if the depression of the accelerator pedal is released partly or fully and the throttle opening is reduced. This will be described with reference to FIG. 13. When the shift control is changed from the mode 0 to the mode 1, the shift area indicated by hatching A is enlarged. On a frequently meandering uphill road, an operation line indicated by the throttle opening, which corresponds to the depression of the accelerator pedal operated by the driver, and the vehicle speed draws a circle, which often appears in the area of the hatching A shown in FIG. 13. As a result, even if a meandering uphill road continues, the number of upshifts to be performed is reduced so that the problem of shift hunching is reduced.

Processing routine in the current mode 2

Figure 14:
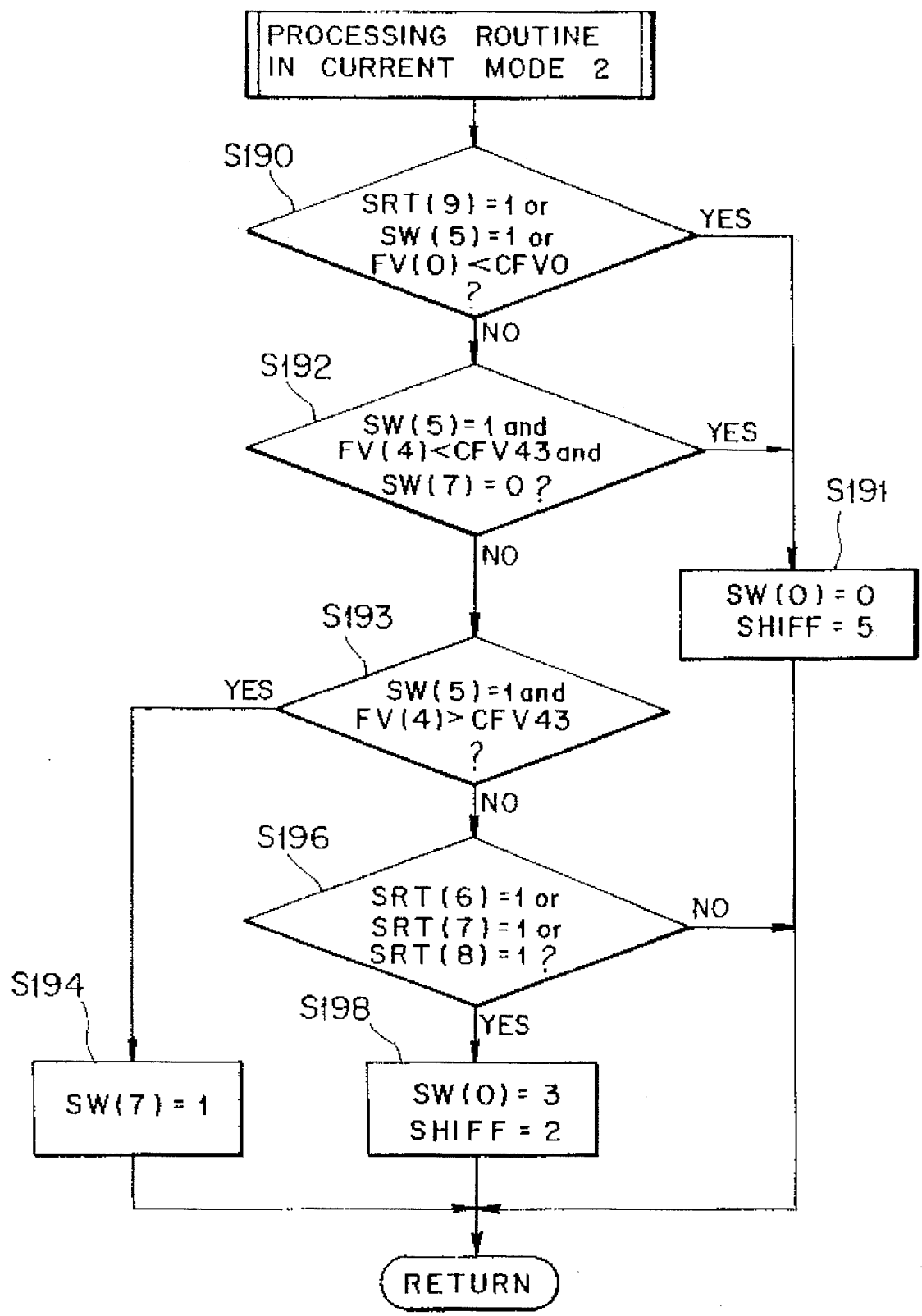
FIG. 14 is a flow chart showing procedures of processing by the shift control system where the current mode is 2 (namely, a shift control method according to the one embodiment of the present invention for the vehicle automatic transmission)

When the current shift control is being performed in the control mode 2, the speed range is controlled in accordance with the flow chart of FIG. 14. The control mode 2 is, as has been described above, the downhill weak engine brake mode in which the vehicle runs down on a downhill slope while maintaining the 3rd speed range. Depending on the degree of depression of the accelerator pedal, the speed range may however be shifted to one of the 1st to 4th speed ranges. From this control mode, it is possible to move to the mode 0 or the mode 3 as shown in FIG. 4.

In the case of the control mode 2, it is determined in step S190 whether any one of the following conditions is established or not as shown in FIG. 14: (a) the control variable SRT(9) is value 1, (b) the fuzzy input switch SW(5) is value 1 and (c) the vehicle speed FV(0) is smaller than the predetermined value CFV0 (for example, 10 km/hr).

The control variable SRT(9) is to store the establishment of the rule 9. As shown in Table 6, the establishment of this rule indicates that the mode should be changed to the mode 0. The fuzzy input switch SW(5) is to store that the throttle opening is large. If even one of the conditions for the determination in step S190 is established, step S191 is executed, so that the fuzzy input switch SW(0) is set at value 0 and value 5 is set at the fuzzy shift position variable SHIFF. This routine is hence ended. In this case, the control mode is changed from the downhill weak engine brake mode 2 to the normal mode 0.

When the results of the determination in step S190 are "NO", the routine advances to step S192 so that it is determined whether all the following conditions are established or not: (a) the fuzzy input switch SW(5) is value 1, (b) the throttle opening FV(4) is smaller than a predetermined value CFV43 (for example 40%), and (c) the fuzzy input switch SW(7) is value 0.

The fuzzy input switch SW(5) is to store that the throttle opening is large as described above. Further, the fuzzy input switch SW(7) is to set its value at 1 when the accelerator pedal is strongly depressed while an engine brake is being applied at the 3rd speed range, and is to store this state. Accordingly, the fuzzy input switch SW(7) of 0 means that the accelerator pedal was not strongly depressed during application of a 3rd-speed engine brake. In other words, step S192 determines the driver's intention of a medium acceleration. When the results of this determination are "YES", the routine advances to step S191 so that the fuzzy input switch SW(0) is set at value 0 and value 5 is set as the fuzzy shift position variable SHIFF. The mode is therefore changed to the normal mode 0. In this case, the speed range is determined using an upshift in the normal mode so selected, so that the speed range is held at the 3rd speed range or upshifted to the 4th speed range in accordance with the throttle opening and the vehicle speed. When upshifted to the 4th speed range, it is possible to reduce the amount of depression of the accelerator pedal and hence to obtain the feeling of an acceleration conforming with the driver's intended acceleration on the downhill slope.

When the results of the determination in step S192 are "NO", the routine advances to step S193 Here, it is determined whether the fuzzy input switch SW(5) is value 1 or not and whether the throttle opening FV(4) is greater than the above-described predetermined value CFV43 (40%) or not. This step S193 is to determine the driver's intention for a high acceleration. When the results of this determination are "YES", step S194 is executed to set value 1 at the fuzzy input SW(7) to complete this routine. In this case, the 3rd speed range is maintained and the shift control in the mode 2 is continued, whereby a high acceleration on a downhill slope is performed. Further, the mode 2 is a shift control mode in which the vehicles runs down on a gentle downhill road while applying an engine brake. If the driver highly accelerates the vehicle while driving it as described above, a strong brake is expected to become necessary at the next corner. The fuzzy input switch SW(7) is used as a flag for commanding a strong engine brake at the time of the strong brake which will be required subsequent to the high acceleration. Namely, by setting value 1 at the fuzzy input switch SW(7), the determination in the above-described step S192 results in "NO" even if the throttle opening is large by the fuzzy input switch SW(5) but is smaller than the predetermined value CFV43 (40%). As a result, the shift control is not performed in the normal mode 0 in step S191 but as will be described subsequently herein, the current control mode, that is, the downhill weak engine brake mode 2 or the downhill strong engine brake mode 3 is executed. This makes it possible to reduce the number of braking operations.

When the results of the determination in step S193 are "NO", step S196 is executed to determine whether any one of the control variables SRT(6), SRT(7) and SRT(8) storing the establishment of the corresponding rules is value 1 or not. These variables are, as described above, to store the establishment of the rules 6, 7 and 8, respectively, and as illustrated in Table 6, the establishment of any one of these rules indicates that the mode 3 should be entered. Accordingly, when the results of the determination in step S196 are "YES", the routine advances to step S198, where the fuzzy input switch SW(0) is set at value 3 and value 2 is set as the fuzzy position variable SHIFF. Accordingly, the routine is ended. The mode 3 is, as described above, the mode in which the vehicle is forced to run down at the 2nd speed range on a downhill slope.

When any of the control variables SRT(6), SRT(7) and SRT(8) is not value 1 and the results of the determination in step S196 are "NO", the routine is then ended without any further performance. Namely, the shift control in the current control mode 2 is continuously performed to avoid unnecessary gear shifts.

Processing routine in the current mode 3

Figure 15:
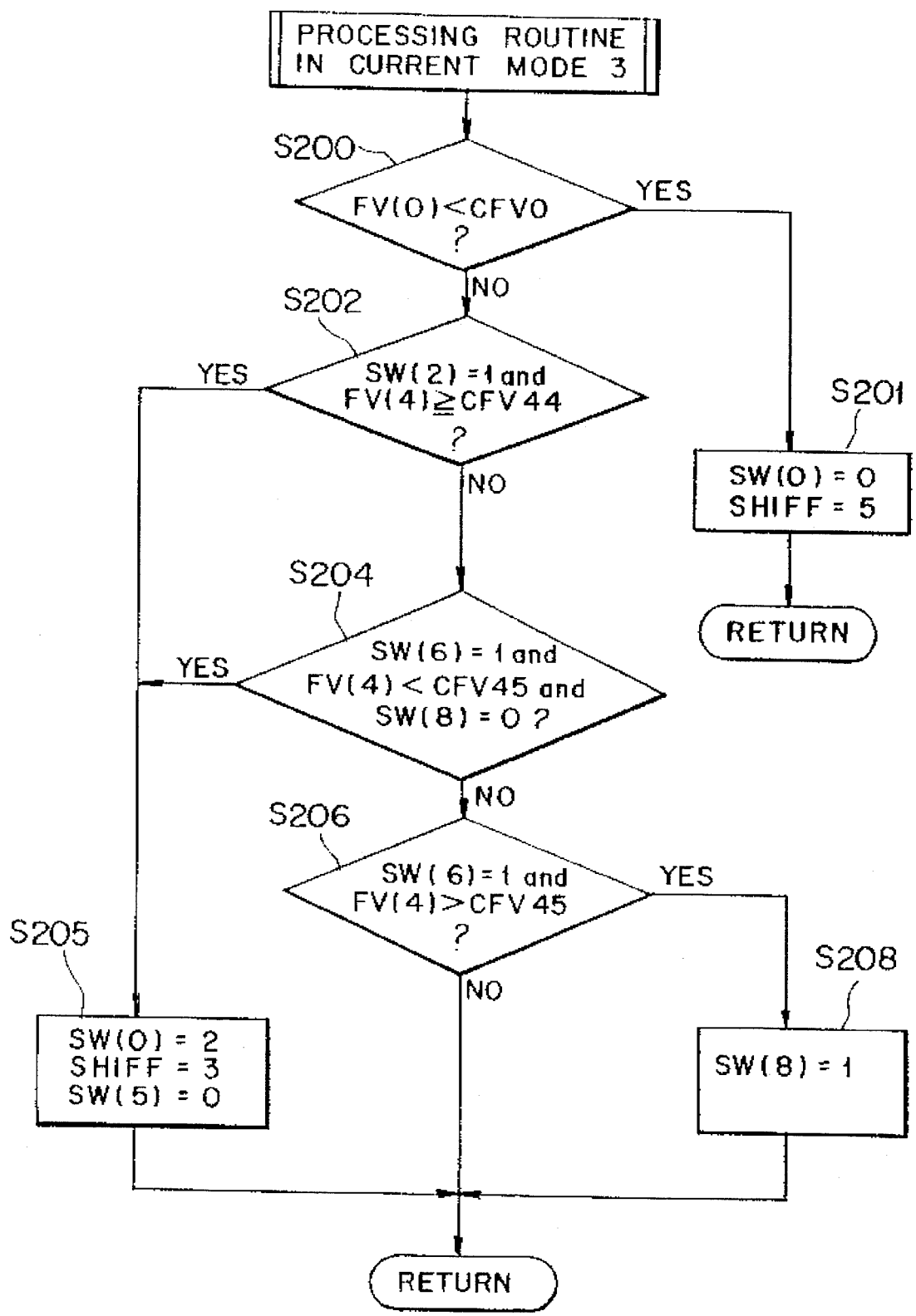
FIG. 15 is a flow chart depicting procedures of processing by the shift control system where the current mode is 3 (namely, a shift control method according to the one embodiment of the present invention for the vehicle automatic transmission)

When the current shift control is being performed in the control mode 3, the speed range is set in accordance with the flow chart of FIG. 15. The control mode 3 is, as described above, the downhill strong engine brake mode in which the vehicle runs down on a downhill slope while holding the 2nd speed range. As shown in FIG. 4, it is possible to move from this control mode 3 to the mode 0 or the mode 2.

In the case of the control mode 3, reference is had to FIG. 15. When the results of the determination in step S200 are "NO", the routine advances to step S202. It is then determined whether or not the fuzzy input switch SW(2) is value 1 and whether or not the throttle opening FV(4) is equal to or greater than a predetermined value CFV44 (for example, 3%). The fuzzy input switch SW(2) is to store that as described above, the weight-grade resistance is non-negative. Namely, it is determined in step S202 whether or not the road has returned from a downhill road to a flat road and also whether the accelerator pedal is slightly depressed. When the results of the determination are "YES", the routine advances to step S205 so that the fuzzy input switch SW(0) is set at value 2, the value 0 is set to the fuzzy input switch SW(5) and the fuzzy shift position variable SHIFF is set at value 3 so that the mode is changed to the downhill weak engine brake mode 2.

When the results of the determination in step S202 are "NO", the routine advances to step S204 Here, it is determined whether or not the fuzzy input switch SW(6) is value 1, whether or not the throttle opening FV(4) is smaller than a predetermined value CFV45 (for example, 40%) and whether or not the fuzzy input switch SW(8) is value 0. The fuzzy input switch SW(6) is, as described above, to store that the throttle opening is medium. The fuzzy input switch SW(8) is, as will be described subsequently herein, strong depression of the accelerator pedal upon an engine brake at the 2nd speed. Accordingly, the determination of these parameters is to determine the driver's intention of a medium acceleration. When the results of this determination are "YES", the routine advances to step S205 as described above so that value 2 is set to the fuzzy input switch SW(0), value 0 is set to the fuzzy input switch SW(5) and value 3 is set as the fuzzy shift position variable SHIFF. Accordingly, the mode is changed to the downhill weak engine brake mode 2. In other words, the speed range is upshifted from the 2nd speed range to the 3rd speed range so that an amount of depression of the accelerator pedal is reflected more clearly than the case of the 2nd speed range. It is hence possible to obtain the feeling of an acceleration conforming with the driver's intention for an acceleration on a downhill slope.

When the results of the determination in step S204 are "NO", the routine advances to step S206, where it is determined whether or not the fuzzy input switch SW(6) is value 1 and whether or not the throttle opening FV(4) is greater than the above-described predetermined value CFV45 (40%). This step is to determine the driver's intention for a high acceleration. When the results of this determination are "YES", step S208 is executed so that value 1 is set to the fuzzy input switch SW(8). This routine is hence ended. In this case, the 2nd speed range is maintained so that the shift control in the mode 3 is continued. As a result, a high output conforming with the driver's intention for a high acceleration on a downhill slope can be obtained. The mode 3 is a shift control mode in which the vehicle runs down on a steep downhill road while applying strong engine brakes. If the driver suddenly accelerates the vehicle during such driving and then enters a corner, a strong brake is expected to be needed. The fuzzy input switch SW(8) is also used as a flag for commanding a strong engine brake at the time of the strong brake which is applied subsequent to the high acceleration. By setting this fuzzy input switch SW(8) at value 1, the results of the determination in the above-described step S204 become "NO" even if the throttle opening is medium, i.e., smaller than the predetermined value CFV45 (40%). Accordingly the current control mode, that is, the downhill strong engine brake mode 3 is always executed continuously so that a strong engine brake is applied at the 2nd speed range.

When the results of the determination in the above-described step S206 are "NO", this routine is ended without setting value 1 to the fuzzy input switch SW(8). In this case, the 2nd speed range is maintained to continue the shift control in the mode 3, whereby unnecessary gear shifts can be avoided.

Processing routine in the current mode 4

Figure 16:
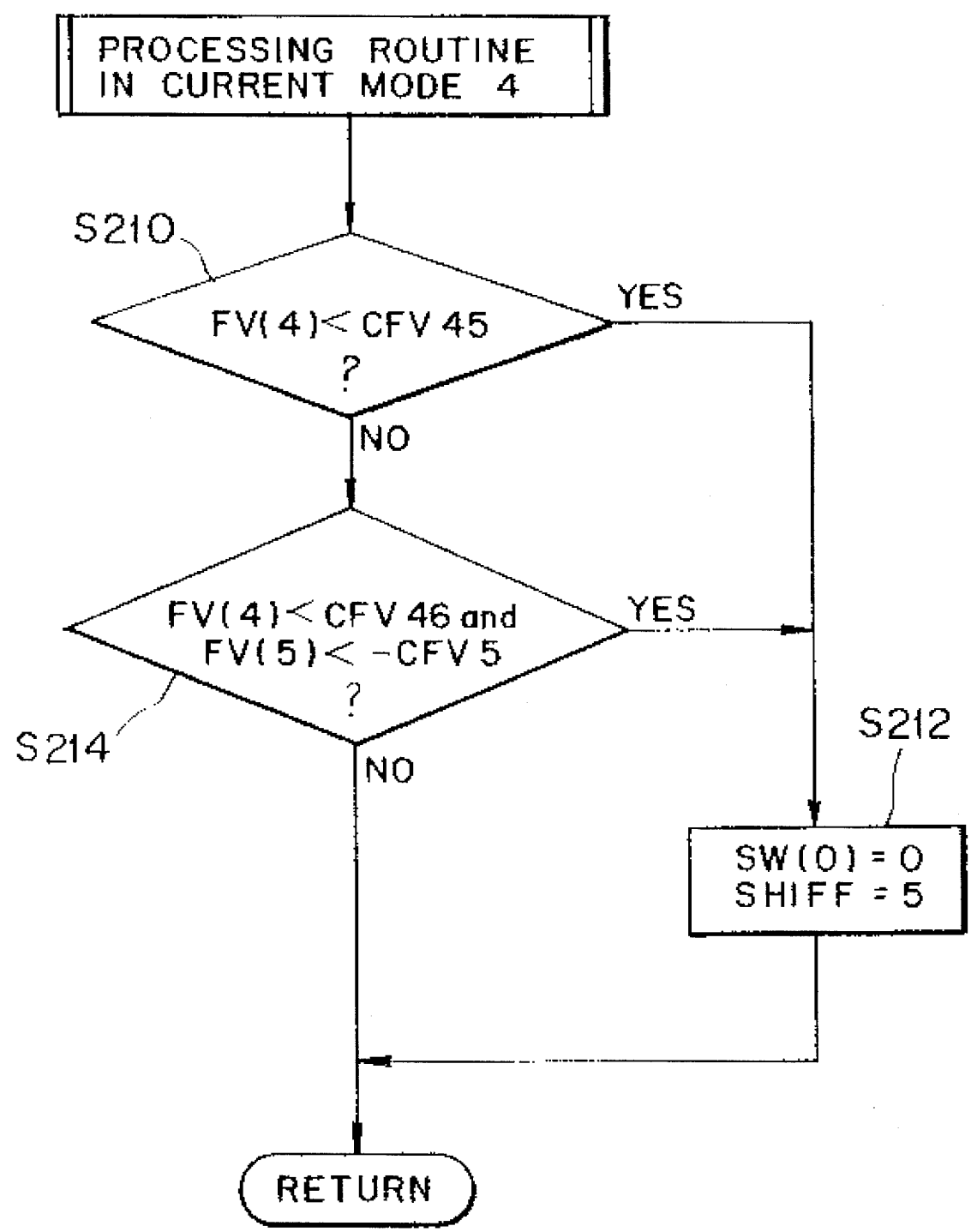
FIG. 16 is a flow chart depicting procedures of processing by the shift control system where the current mode is 4 (namely, a shift control method according to the one embodiment of the present invention for the vehicle automatic transmission)

When the current shift control is performed in the control mode 4, the speed range is set in accordance with the flow chart of FIG. 16. The control mode 4 is, as described above, the straight uphill mode. Where the shift position set based on the shift pattern for the normal mode 0 is the 4th speed range or the 3rd speed range, the speed range is downshifted to the 3rd speed range or the 2nd speed range, respectively, so that a necessary drive force can be obtained. From this control mode, it is only possible to move to the mode 0 as shown in FIG. 4.

Namely, as shown in FIG. 16, it is determined in step S210 whether or not the throttle opening FV(4) is smaller than a predetermined value CFV45 (for example, 10%). If the throttle opening FV(4) is smaller than the predetermined value CFV45, step S212 is executed so that the fuzzy input switch SW(0) is set at value 0 and value 5 is set as the fuzzy shift position variable SHIFF. This routine is hence ended. In this case, the control mode is moved from the straight uphill mode 4 to the normal mode 0.

When the results of the determination in step S210 are "NO", the routine advances from step S210 to step S214, where it is then determined whether or not the throttle opening FV(4) is smaller than a predetermined value CFV46 (for example, 25%) and whether or not the accelerator pedal depressing speed FV(5) is lower than a predetermined negative value (−CFV5). When both the conditions are met at the same time, the routine advances to step S212, where the fuzzy input switch SW(0) is set at value 0 and value 5 is set as the fuzzy shift position variable SHIFF. As a result, the mode is changed to the normal mode 0.

When the results of the determination in step S214 are "NO", this routine is ended without any execution. In this case, the current control mode is continued as is.

Processing routine for the output of a shift position

When the processing in each mode has been completed as described above, a control signal corresponding to a shift position set by the change-over command means 8 is outputted to the engagement state control means 9. The output procedure of this shift position control signal is designed to output the control signal only when it has become necessary to change the current shift position as a result of a fuzzy judgment. Further, as conditions for performing an actual shifting operation, it is necessary to satisfy all the following conditions: (a) a predetermined time (for example, 0.5 second) has elapsed since the last shift, (b) the absolute value of a steering wheel angle falls between predetermined values and (c) the absolute value of a lateral acceleration falls between predetermined values. If any one of these conditions is not met, the shift position will not be changed.

Figure 17:
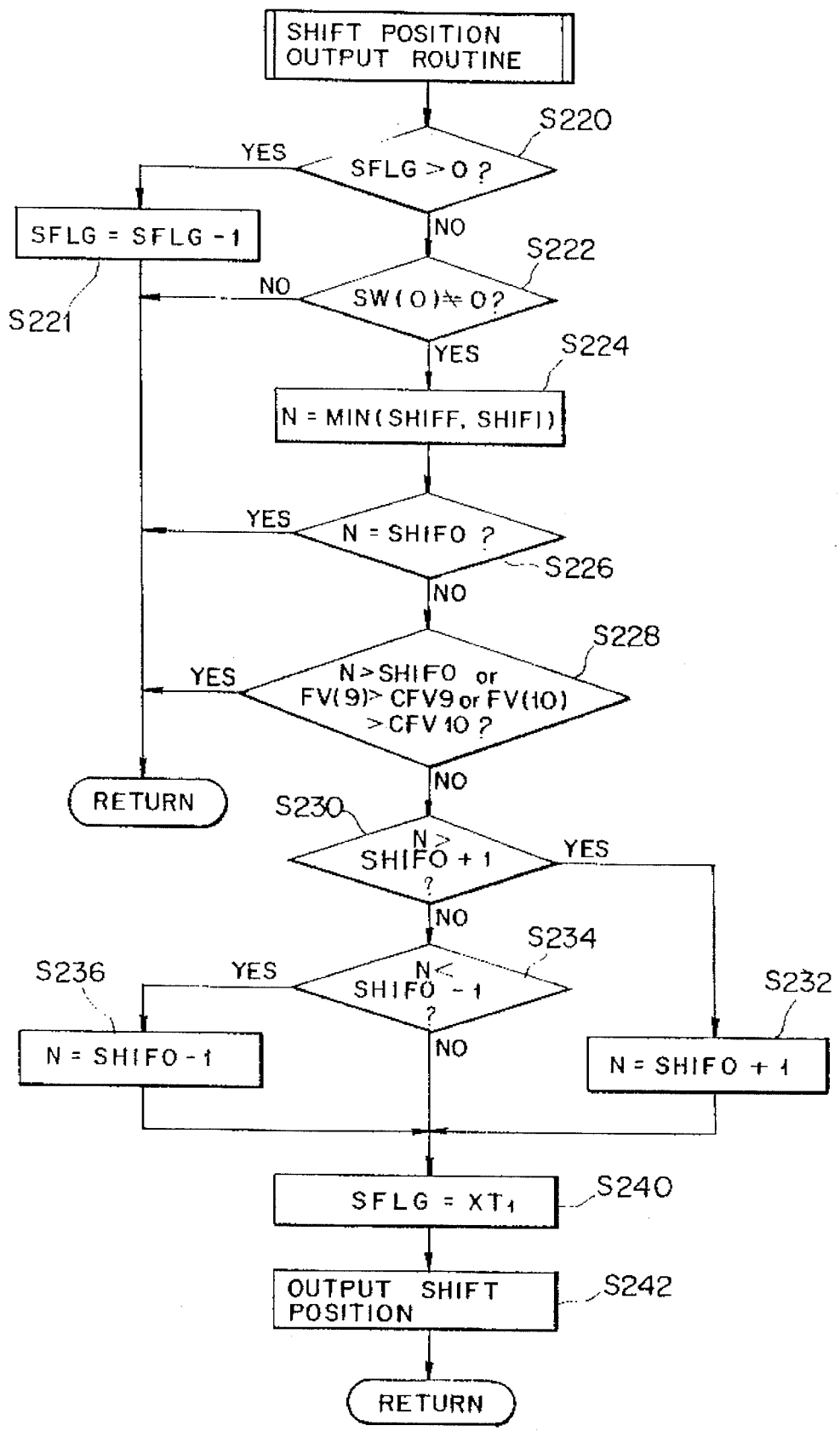
FIG. 17 is a flow chart illustrating procedures for outputting a shift position control signal by the shift control system (namely, a shift control method according to the one embodiment of the present invention for the vehicle automatic transmission)

This will be described specifically with reference to the flow chart of FIG. 17. First, it is determined in step S220 whether or not the 0.5 second counter SFLG is greater than 0. The 0.5 second counter SFLG is a downcounter for determining whether a predetermined time (0.5 second) has elapsed from the time point of the last shifting operation, and when a shifting operation has been effected, is reset at an initial value. When the results of the determination in step S220 are "YES", the predetermined time (0.5 second) has not elapsed yet from the last shifting operation and in such a case, the counter value SFLG is decremented by value 1 in step S221 to end this routine. Even if a new shift position is set before the counter value SFLG has not been downcounted to 0, no shifting operation to the shift position is performed.

When a predetermined time has elapsed from the last shifting operation and the results of the determination in step S220 are "NO", the routine advances to step S222, where it is then determined whether the fuzzy input switch SW(0) is a value other than value 0. When the fuzzy input switch SW(0) is not any value other than value 0, in other words, is value 0, shift control in the mode 0 is meant. In this case, the routine is ended without any performance. Since the normal mode 0 is an ordinary shift control, it is unnecessary to perform interrupt shift control by fuzzy control. As described above, a shift position control signal is outputted to the speed-range shifting mechanism 4 in accordance with an ordinary shift control program provided separately.

When the fuzzy input switch SW(0) has been determined to be a value other than value 0 and the results of the determination in step S222 are "YES", the routine advances to step S224. The smaller one of the fuzzy position variable SHIFF and the shift stage SHIF1 set based on the shift pattern for the normal mode 0 is selected and is set as a shift position command value to the variable N. Where the speed range SHIF1 determined by the shift pattern provided for use in the normal mode 0 is smaller even during the fuzzy control, the speed range is preferentially chosen. Namely, the fuzzy shift position SHIFF is selected only when the fuzzy shift position SHIFF is a speed range lower than the shift stage SHIF1 set based on the shift pattern for the normal mode 0.

It is next determined whether or not the thus-selected value of the shift position command variable N is equal to the currently-commanded speed range SHIF0 (step S226). When they are equal to each other, no shifting operation is needed so that the routine is ended.

When the results of the determination in step S226 are "NO", on the other hand, it is determined in step S228 whether or not any one of the following conditions has been established: (a) the value of the shift position command variable N is greater than a currently-commanded speed range SHIF0, (b) the value of the steering wheel angle absolute value FV(9) is greater than a predetermined value CFV9 and (c) the lateral acceleration absolute value FV(10) is greater than a predetermined value CFV10. If any one of the conditions has been established, the determination in step S228 results in "YES". In this case, this routine is ended without changing the shift position, namely, without changing over the speed range. Accordingly, when an upshift is commanded by the shift position command variable N, the absolute value of the steering wheel angle is greater than the corresponding predetermined value or the absolute value of the lateral acceleration is greater than the corresponding predetermined value, a shifting operation is prohibited.

When none of the conditions is determined to have established in step S228 and the results of the determination in this step are hence "NO", step S230 is executed. In step S230, it is determined whether or not the value of the shift position command signal N is greater than a value higher by one stage than the currently-commanded speed range SHIF0, in other words, whether or not the speed range is upshifted by two stages or more at once by the current shift position command variable N. If the speed range is upshifted by two stages or more at once by the current shift position command variable N, the command variable N is set at value (SHIF0+1) in step S232 to limit the current upshifting operation to the speed range higher by only one stage than the currently-commanded speed range SHIF0, and the routine then advances to step S240 to be described subsequently herein.

When the results of the determination in step S230 are "NO", on the other hand, the routine advances to step S234. It is now determined whether or not the value of the shift position command signal N is smaller than a value lower by one stage than the currently-commanded speed range SHIF0, in other words, whether or not the speed range is downshifted by two stages or more at once by the current shift position command variable N. If the speed range is downshifted by two stages or more at once by the current shift position command variable N, the command variable N is set at value (SHIF0−1) in step S236 to limit the current downshifting operation to the speed range lower by only one stage than the currently-commanded speed range SHIF0, and the routine then advances to step S240 to be described subsequently herein.

When the results of the determination in step S234 are "NO", the value of the shift position command variable N is maintained unchanged and the routine then advances to step S240.

After resetting the value of the 0.5 second counter SFLG to a predetermined value XT1 (a value corresponding to 0.5 second) in step S240, step S242 is executed to output a shift position control signal, which corresponds to the shift position command variable N, to the speed-range shifting mechanism 4. Accordingly, this routine is ended.

The shift position control signal outputted in step S240 has been obtained by performing computation on the basis of fuzzy control. This signal has higher precedence than the shift position control signal outputted in the normal mode 0 and is executed interrupting the shift position control signal outputted in the normal mode 0.

Shift controlling hydraulic pressure command routine

The routine for commanding a shift controlling hydraulic pressure normally sets a hydraulic pressure control pattern Ⓐ [see FIG. 3(b)], which places importance on the response of each change-over in speed range, by the engagement stage control means 9. However, in the case of a downshift on a downhill road, said downshift being performed without depression of the accelerator pedal by the driver and being hardly predictable by the driver, the hydraulic control pattern Ⓑ which places importance on the smoothness of each change-over in speed range [see FIG. 3(b)] is set.

Figure 18:
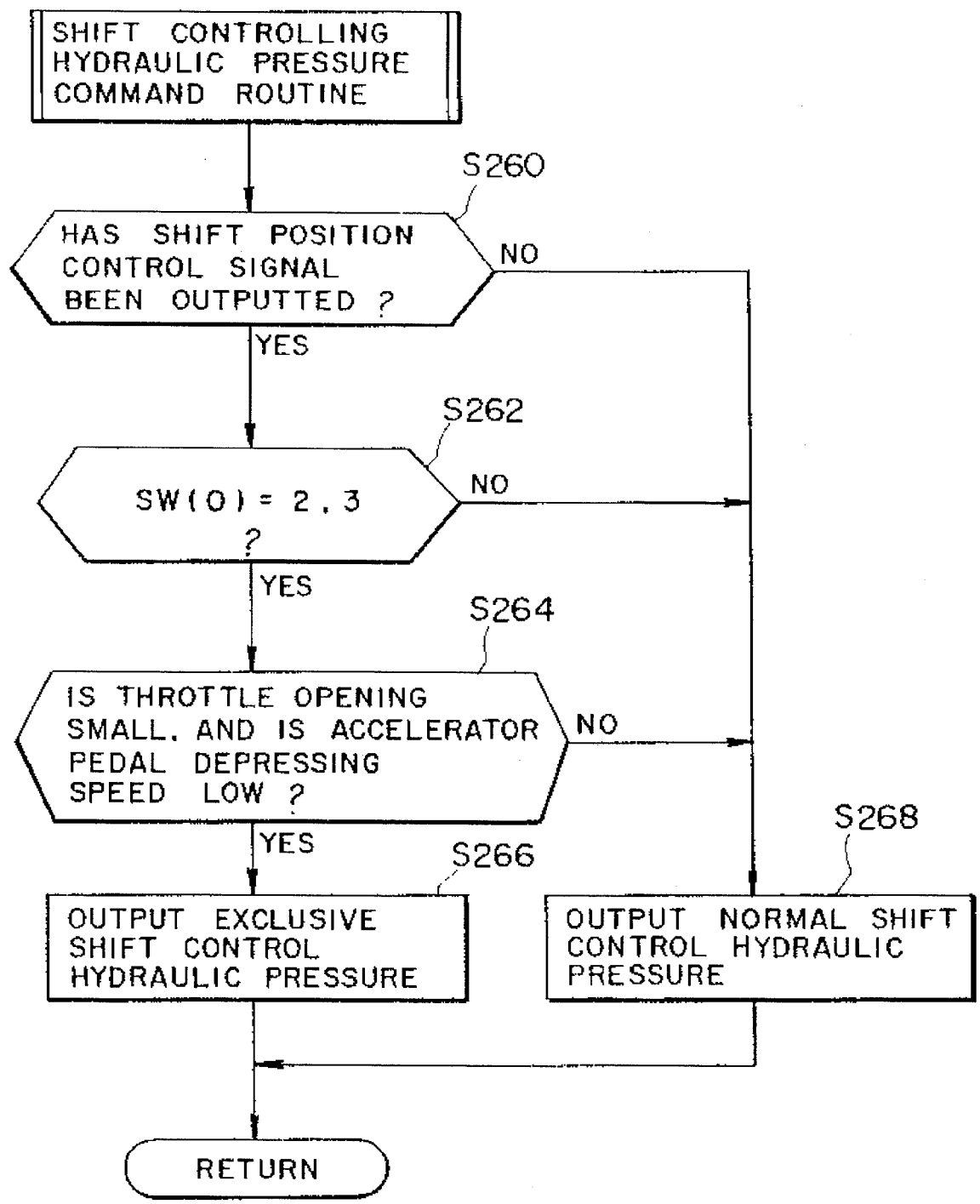
FIG. 18 is a flow chart illustrating procedures for commanding an engaging force for an engaging element by the shift control system (namely, a shift control method according to the one embodiment of the present invention for the vehicle automatic transmission)

As is illustrated, for example, in FIG. 18, it is first determined in step S260 if the shift position control signal has been outputted. If the output of the shift position control signal is determined, the routine advances to step S262, where it is then determined whether the fuzzy input switch SW(0) has been set at 2 or 3. If the fuzzy input switch SW(0) has been set at 2, it is meant that the control mode 2 has been selected. If the fuzzy input switch SW(0) has been set at 3, on the other hand, it is meant that the control mode 3 has been selected. The control mode 2 is the downhill weak engine brake mode whereas the control mode 3 is the downhill strong engine brake mode. Each of these modes corresponds to the downhill downshift mode.

When the results of the determination in step S262 are "YES", the routine advances to step S264, where it is then determined whether the throttle opening is small or not and also whether the accelerator pedal depression speed (note: the absolute value of the speed is used here) is small or not. The determination of whether the throttle opening is small or not and also whether the accelerator pedal depression speed is small or not can be conducted, for example, by setting appropriate reference values for the determination of the throttle opening and the accelerator pedal depressing speed and comparing detected throttle opening and accelerator depressing speed with these reference values, respectively.

This determination in step S264 is to determine whether or not a throttle operation (accelerator pedal operation) has not been performed. This is equivalent to the determination of whether or not the downshift on the downhill road to be performed at this time is hardly predictable by the driver. Upon conducting a downshift on a downhill road, the throttle opening is usually small. Even if the throttle opening is small, the driver may suddenly release the depression of the accelerator pedal in some instances. This release is reflected as a corresponding negative value in the accelerator depression speed. This sudden release of the depression of the accelerator pedal can be estimated as the driver's attempt or intention to reduce the vehicle speed. In this case, the downshift on the downhill road is considered to be predictable by the driver.

When the results of the determination in step S264 are "YES", the routine advances to step S266, where a control signal is then outputted to the engaging force regulating means 5 to regulate the hydraulic pressure to the exclusive shift controlling hydraulic pressure, in other words, to perform the regulation of the hydraulic pressure in accordance with the hydraulic pressure control pattern Ⓑ which places importance on the smoothness of each change-over in speed range [see FIG. 3(b)].

When the results of the determination in any one of steps S260, S262 and S264 are "NO", the routine advances to step S268, where a control signal is then outputted to the engaging force regulating means 5 to regulate the hydraulic pressure to the normal shift controlling hydraulic pressure, in other words, to perform the regulation of the hydraulic pressure in accordance with the hydraulic pressure control pattern Ⓐ which places importance on the response of each change-over in speed range [see FIG. 3(b)].

The shift control system and methods according to the one embodiment of the present invention, which are suited for use with a vehicle automatic transmission, are constructed as described above, so that when running, for example, on a downhill slope, an optimal speed range can always be set by taking into parallel consideration the driving behavior intended by the driver, the conditions of a road and the state of operation of the vehicle, for example, a speed range can be set in conformity with the driver's intended driving behavior such as an acceleration or deceleration of the vehicle.

If the driver's manner of driving or the conditions of a road do not desire an acceleration but rather desires a deceleration, for example, upon running down on a downhill slope, the downhill weak engine brake mode (i.e., the control mode 2) or the downhill strong engine brake mode (i.e., the control mode 3) is selected to forcedly perform a downshift. This makes it possible to allow the vehicle to run down while applying engine brakes, thereby minimizing braking operations to be needed by the driver and hence facilitating the driving on the downhill slope.

If the driver cannot predict a downshift on a downhill road, the hydraulic pressure to each corresponding engaging element 3A is controlled at the time of the downshift in accordance with the hydraulic pressure control pattern Ⓑ [see FIG. 3(b)] which places importance on the smoothness of each change-over in speed range.

As a result, as illustrated in FIG. 3(e), a sudden change in the torque of the drive torque, said change occurring upon full engagement of a clutch upon completion of a shifting operation, is reduced from $T_1$ to $T_2$, thereby reducing a shift shock and avoiding a sense of incongruity to the driver at the time of the shifting.

If as illustrated by way of example in FIG. 20, the vehicle speed increases from point A to point D on a downhill slope although the driver does not operates the throttle valve, a downshifting operation is performed because of the control making use of the fuzzy inference and the driver is hence surprised, although an upshift would be performed if the vehicle were running on a flat road. The present invention can avoid such a surprise.

As a consequence, the smoothness of shifting operations, which is an inherent characteristic feature of an automatic transmission, can be assured, so that the drivability and hence the riding comfort can be improved.

In the case of such shifting as causing no troublesome shift shock or where the driver can predict a downshift even if the downshift is effected on a downhill road, the hydraulic pressure to each corresponding engaging element 3A is controlled at the time of the shifting in accordance with the ordinary hydraulic pressure control pattern Ⓐ [see FIG. 3(b)] which places importance on each change-over in speed range. This makes it possible to promptly perform the shifting operation without giving a sense of incongruity to the driver, whereby the running performance of the vehicle can be improved.

The shift control system and methods according to the present invention, which are suited for use with the vehicle automatic transmission, are intended to avoid by the use of the fuzzy inference a sense of incongruity of a shift shock to the driver upon conducting a downshift to apply an engine brake on a downhill road. It is to be noted that the shift control itself by the fuzzy inference, that is, the fuzzy control per se is not limited to that specifically employed in the above-described embodiment.

Figure 19:
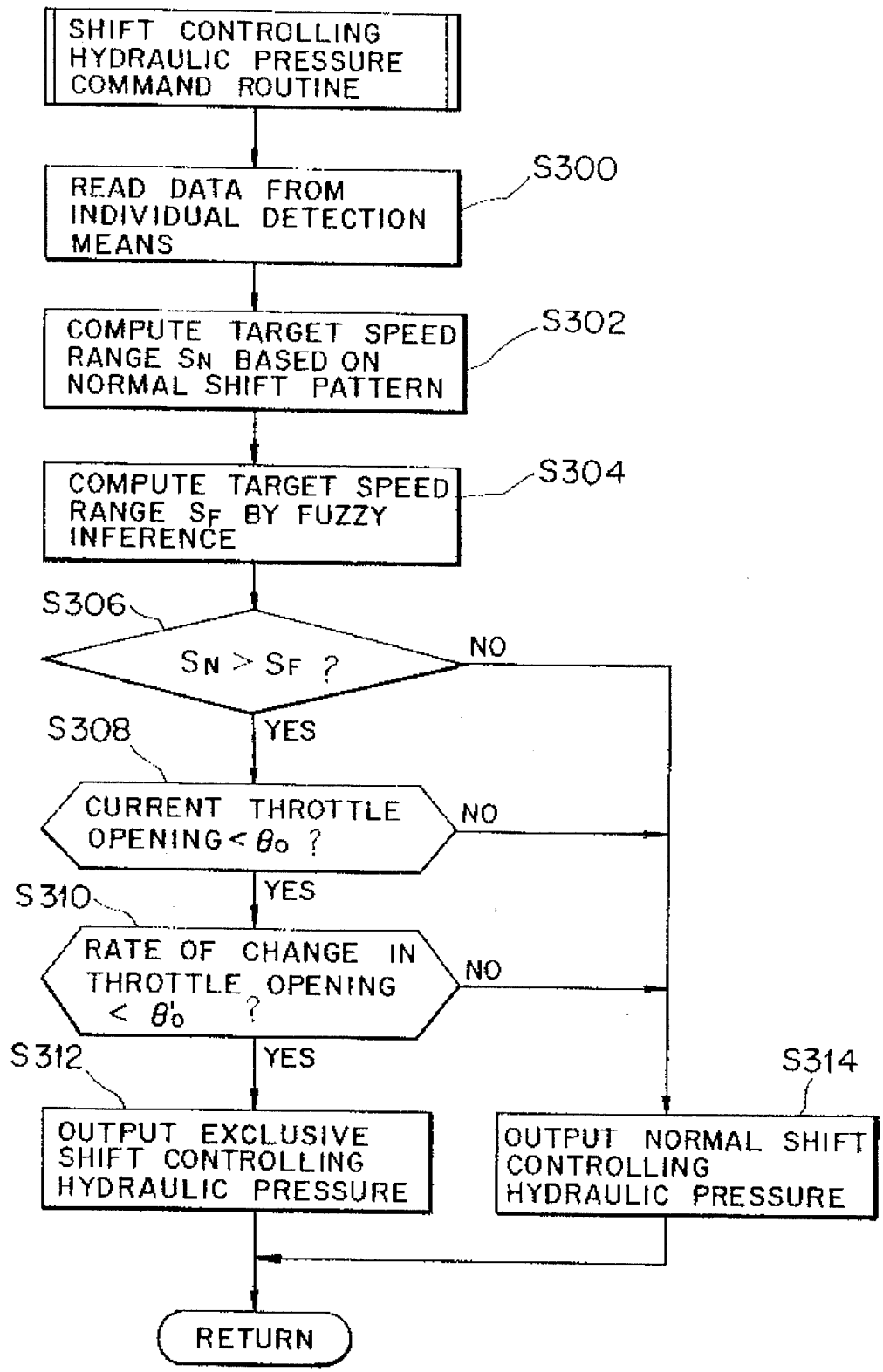
FIG. 19 is a flow chart showing another example of procedures for commanding an engaging fore for an engaging element by the shift control system (namely, a shift control method according to the one embodiment of the present invention for the vehicle automatic transmission)

In view of an application to other fuzzy controls, a shift control hydraulic pressure command routine having still broader general applicability will now be considered. For example, it is possible to contemplate of such a flow chart as shown in FIG. 19. As is illustrated in FIG. 19, data from individual detection means such as the grade detection means 10, the meandering degree detection means 11, the vehicle speed detection means 12, the throttle operation detection means (throttle opening sensor) 13 and the brake switch 14 are read (step S300). Based on these data, a target speed range $S_N$ is computed by the first speed-range setting means 7A in accordance with the normal shift pattern (step S302) and a target speed range $S_F$ is also computed by fuzzy inference at the second speed-range setting means 7B (step S304).

It is next determined if the target speed range $S_F$ by the fuzzy inference is lower than the target speed range $S_N$ by the normal shift pattern (step S306). Also determined are if a current throttle opening (which corresponds to the amount of current depression of the accelerator pedal) is smaller than a predetermined reference value $\theta_0$ for determination (step S308) and also if the rate of a change in throttle opening (which corresponds to an accelerator pedal depressing speed) is smaller than a predetermined reference value $\theta_0'$ for determination (step S310).

When the determination in each of steps S306, S308 and S310 has resulted in "YES", the routine advances to S312, where a control signal is then outputted to the engaging force regulating means 5 to regulate the hydraulic pressure to an exclusive shift controlling hydraulic pressure, in other words, to perform the regulation of the hydraulic pressure in accordance with the hydraulic pressure control pattern Ⓑ which places importance on the smoothness of each change-over in speed range [see FIG. 3(b)].

When the results of the determination in any one of steps S306, S308 and S310 are "NO", the routine advances to step S314, where a control signal is then outputted to the engaging force regulating means 5 to regulate the hydraulic pressure to a normal shift controlling hydraulic pressure, in other words, to perform the regulation of the hydraulic pressure in accordance with the hydraulic pressure control pattern Ⓐ which places importance on the response of each change-over in speed range [see FIG. 3(b)].

I claim:

1. A shift control system for a vehicle automatic transmission in which desired one of plural speed ranges is achieved by selectively changing over a state of engagement of plural engaging elements, comprising:

an engine load sensor for detecting an opening of a throttle valve or an amount of depression of an accelerator pedal arranged to control an output of an engine connected to said automatic transmission;

detecting means for detecting, based on output of said engine load sensor, a rate of change in the opening of said throttle valve or a rate of change in said amount of depression of said accelerator pedal;

determining means for determining a state of driving of a vehicle by a fuzzy inference;

setting means for setting an optimal speed range from said plural speed ranges on a basis of results of determination by said determining means; and controlling means for selectively controlling a state of engagement of said plural engaging elements, wherein said setting means is provided with means for setting as said optimal speed range a speed range lower than a current speed range when said vehicle has been determined to be running on a downhill road by said determining means, and said controlling means is provided with means for reducing a value of an engagement parameter relating to a change-over of said state of engagement of a desired engaging element for achieving said optimal speed range when said vehicle has been determined to be running on said downhill road and also when said detected opening of said throttle valve or said detected amount of depression of said accelerator pedal is not greater than a first predetermined value and said detected rate of change in said opening of said throttle valve or said detected rate of change in said amount of depression of said accelerator pedal is not greater than a second predetermined value.

2. A shift control system according to claim 1, further comprising:

vehicle speed detecting means for detecting a speed of said vehicle, wherein said setting means comprises, first speed range setting means for setting a first optimal speed range on the basis of said detected opening of said throttle valve or said detected amount of depression of said accelerator pedal and vehicle speed detected by said detecting means and said vehicle speed detecting means, respectively, second speed range setting means for setting, as a second optimal speed range, said speed range lower than said current speed range when said vehicle has been determined to be running on said downhill road by said determining means, and speed range determining means for comparing said first optimal speed range set by said first speed range setting means with said second optimal speed range set by said second speed range setting means and choosing said second optimal speed range set by said second speed range setting means only when said second optimal speed range set by said second speed range setting means is lower than said first optimal speed range set by said first speed range setting means.

3. A shift control system according to claim 1, wherein said engaging elements are hydraulic engaging elements selectively actuated by hydraulic pressure; and said controlling means controls said state of engagement of each of said hydraulic engaging elements by controlling hydraulic pressure to be fed to said hydraulic engaging element.

4. A shift control system according to claim 3, wherein said controlling means is equipped with a first hydraulic pressure feeding pattern for feeding, during a change-over of a speed range, a hydraulic pressure of a predetermined value to the corresponding hydraulic engaging element and a second hydraulic pressure feeding pattern for feeding, during said change-over of said predetermined value to said corresponding hydraulic engaging element; and when said vehicle has been determined to be running on said downhill road by said determining means and also when no change has been determined in said detected opening of said throttle valve or said detected amount of depression of said accelerator pedal by said engine load sensor, said controlling means controls an engagement force of said desired hydraulic engaging element for achieving said optimal speed range on a second hydraulic pressure feeding pattern.

5. A method for controlling a shift of a vehicle automatic transmission in which desired one of plural speed ranges is achieved by selectively changing over a state of engagement of plural engaging elements, comprising:

(a) detecting an opening of a throttle valve or an amount of depression of an accelerator pedal arranged to control an output of an engine connected to said automatic transmission;

(b) detecting, based on said detected opening of said throttle valve or said detected amount of depression of said accelerator pedal, a rate of change in said opening of said throttle valve or a rate of change in said amount of depression of said accelerator pedal;

(c) determining a state of driving of a vehicle by a fuzzy inference;

(d) setting an optimal speed range from said plural speed ranges on a basis of said determination by said step (c); and (e) selectively controlling said state of engagement of said plural engaging elements, wherein said step (d) comprises the substep of setting as said optimal speed state a speed range lower than a current speed range when said vehicle has been determined to be running on a downhill road in said step (c), and wherein said engagement state control step (e) comprises the substep of reducing a value of an engagement parameter relating to a change-over of said state of engagement of a desired engaging element for achieving said optimal speed range when said vehicle has been determined to be running on said downhill road and also when said detected opening of said throttle valve or said detected amount of depression of said accelerator pedal is not greater than a first predetermined value and said detected rate of change in said opening of said throttle valve or said detected rate of change in said amount of depression of said accelerator pedal is not greater than a second predetermined value.

6. The shift method according to claim 5, further comprising:

(f) detecting a speed of said vehicle, wherein said step (e) comprises the substeps of
  (e1) setting a first optimal speed range on a basis of said load on said engine and vehicle speed detected in said step (a) and in said step (e), respectively,
  (e2) setting, as a second optimal speed range, said speed range lower than said current speed range when said vehicle has been determined to be running on said downhill road in said step (c), and
  (e3) comparing said first optimal speed range set in said step (e1) with said second optimal speed range set in said step (e2) and choosing said second optimal speed range set in said step (e2) only when said second optimal speed range set in said step (e2) is lower than said first optimal speed range set in said step (e1).

7. The method according to claim 5, wherein said step (e) includes the substep of controlling said state of engagement of each of hydraulic engaging element by controlling hydraulic pressure to be fed to each of said hydraulic engaging element.

8. The method according to claim 7, wherein said step (e) includes the substeps of
  (e1) preparing a first hydraulic pressure feeding pattern for feeding, during a change-over of the speed range, hydraulic pressure of a predetermined value to the corresponding hydraulic engaging element,
  (e2) preparing a second hydraulic pressure feeding pattern for feeding, during said change-over of the speed range, a hydraulic pressure of a value lower than said predetermined value to the corresponding hydraulic engaging element; and
  (e3) controlling engagement force of said desired hydraulic engaging element for achieving said optimal speed range on a basis of said second hydraulic pressure feeding pattern when said vehicle has been determined to be running on said downhill road in said step (c) and also when no change has been determined in said detected opening of said throttle valve or said detected amount of depression of said accelerator pedal in said step (a).

* * * * *